(12) United States Patent
Ichimura

(10) Patent No.: US 10,504,552 B2
(45) Date of Patent: Dec. 10, 2019

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Gen Ichimura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/753,425

(22) PCT Filed: Aug. 30, 2016

(86) PCT No.: PCT/JP2016/075372
§ 371 (c)(1),
(2) Date: Feb. 19, 2018

(87) PCT Pub. No.: WO2017/043378
PCT Pub. Date: Mar. 16, 2017

(65) Prior Publication Data
US 2018/0247671 A1 Aug. 30, 2018

(30) Foreign Application Priority Data

Sep. 7, 2015 (JP) ................................. 2015-175394

(51) Int. Cl.
*G11B 20/12* (2006.01)
*H04N 21/439* (2011.01)
(Continued)

(52) U.S. Cl.
CPC ...... *G11B 20/1262* (2013.01); *G11B 20/1217* (2013.01); *H04N 5/765* (2013.01);
(Continued)

(58) Field of Classification Search
CPC . G11B 20/12; G11B 20/1217; G11B 20/1262; G11B 2020/10768;
(Continued)

(56) References Cited

U.S. PATENT DOCUMENTS 5,404,362 A * 4/1995 Meitner ............. G11B 20/1403
375/371
6,904,403 B1 6/2005 Muraki et al.
(Continued)

FOREIGN PATENT DOCUMENTS

| CN | 1290006 A | 4/2001 |
|---|---|---|
| CN | 1387189 A | 12/2002 |

(Continued)

OTHER PUBLICATIONS

International Search Report and Written Opinion of PCT Application No. PCT/JP2016/075372, dated Dec. 6, 2016, 13 pages.

*Primary Examiner* — Jesse A Elbin
(74) *Attorney, Agent, or Firm* — Chip Law Group

(57) ABSTRACT

A plurality of kinds of LPCM signals/compression digital audio signals is switched to one another in transmission, thereby enabling audio reproduction to be satisfactorily carried out. A digital audio signal is transmitted to an external apparatus through a predetermined transmission path. Information associated with the digital audio signal to be next transmitted is added to the digital audio signal which is currently being transmitted. For example, first metadata exhibiting a transmission frequency of the digital audio signal, and second metadata exhibiting a data type of the digital audio signal are contained in the information.

36 Claims, 27 Drawing Sheets

(51) Int. Cl.
*H04N 21/434* (2011.01)
*H04N 21/4363* (2011.01)
*H04N 5/765* (2006.01)
*H04N 5/775* (2006.01)
*G11B 20/10* (2006.01)
*H04N 5/85* (2006.01)

(52) U.S. Cl.
CPC ........... *H04N 5/775* (2013.01); *H04N 21/439* (2013.01); *H04N 21/4345* (2013.01); *H04N 21/43632* (2013.01); *H04N 21/43635* (2013.01); *G11B 2020/10833* (2013.01); *G11B 2020/10944* (2013.01); *H04N 5/85* (2013.01); *H04N 21/4363* (2013.01)

(58) Field of Classification Search
CPC ........... G11B 2020/10833; G11B 2020/10989; G11B 2020/10944; G11B 2020/10972; H04N 5/44; H04N 5/60; H04N 5/602; H04N 5/607; H04N 5/765; H04N 5/775; H04N 5/85; H04N 5/9155; H04N 21/4363; H04N 21/43632; H04N 21/43635; H04N 21/4345; H04N 21/439
USPC .......................................................... 700/94
See application file for complete search history.

(56) References Cited

U.S. PATENT DOCUMENTS

| | | | |
|---|---|---|---|
| 7,657,335 B2* | 2/2010 | Sugiyama | G11B 20/10527 700/94 |
| 2002/0168029 A1* | 11/2002 | Onizuka | H04H 20/95 375/316 |
| 2002/0174245 A1 | 11/2002 | Minoshima et al. | |
| 2012/0069894 A1 | 3/2012 | Sakimura et al. | |
| 2012/0081604 A1 | 4/2012 | Hosokawa | |

FOREIGN PATENT DOCUMENTS

| | | |
|---|---|---|
| DE | 60217993 T2 | 11/2007 |
| EP | 1087557 A2 | 3/2001 |
| EP | 1259012 A2 | 11/2002 |
| JP | 2001-094448 A | 4/2001 |
| JP | 2002-344561 A | 11/2002 |
| JP | 2012-75069 A | 4/2012 |
| KR | 10-2001-0050588 A | 6/2001 |
| KR | 10-2002-0088383 A | 11/2002 |
| TW | 594686 B | 6/2004 |
| WO | 2010/140199 A1 | 12/2010 |

* cited by examiner

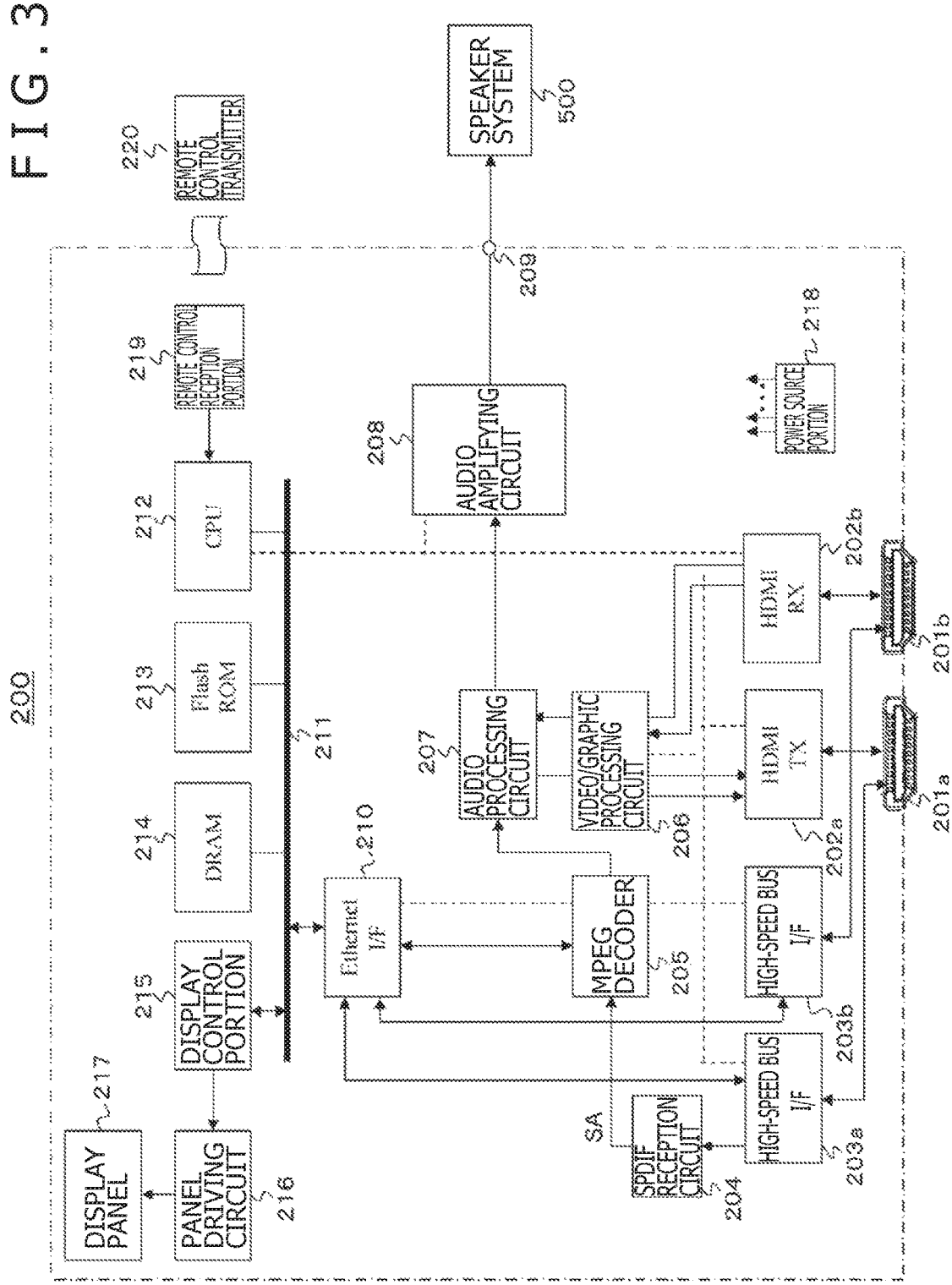

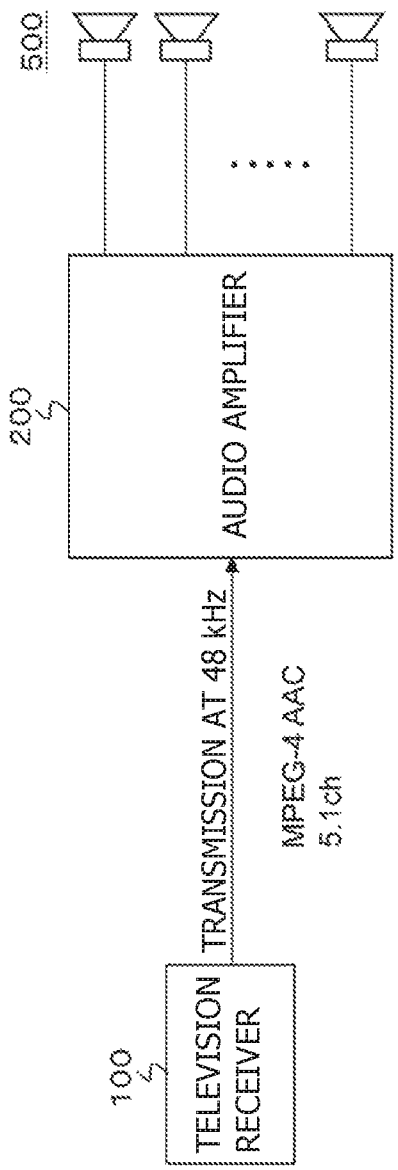
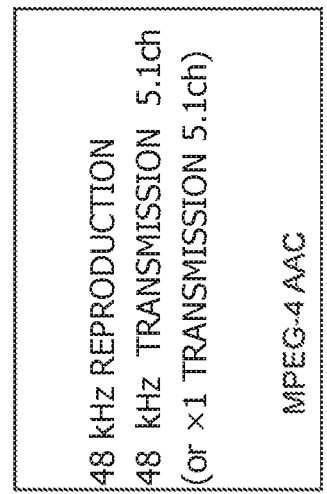

FIG. 9

HDMI PIN ARRANGEMENT (IN CASE OF Type-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

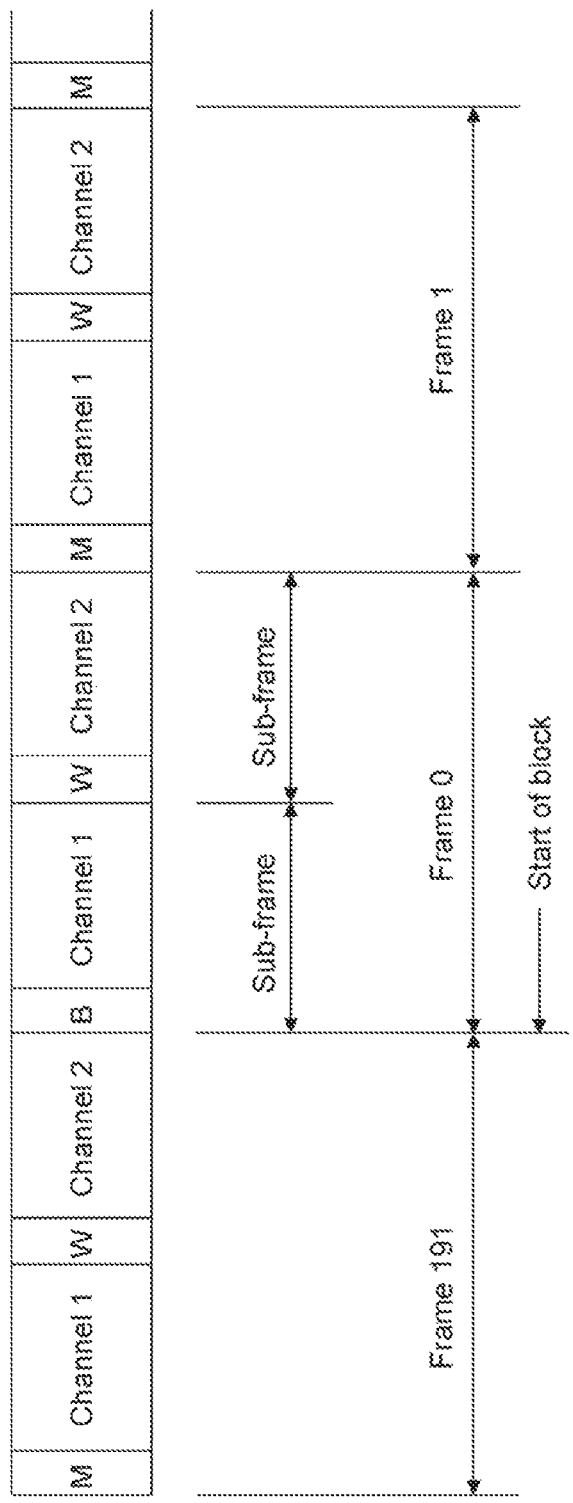
F I G. 12

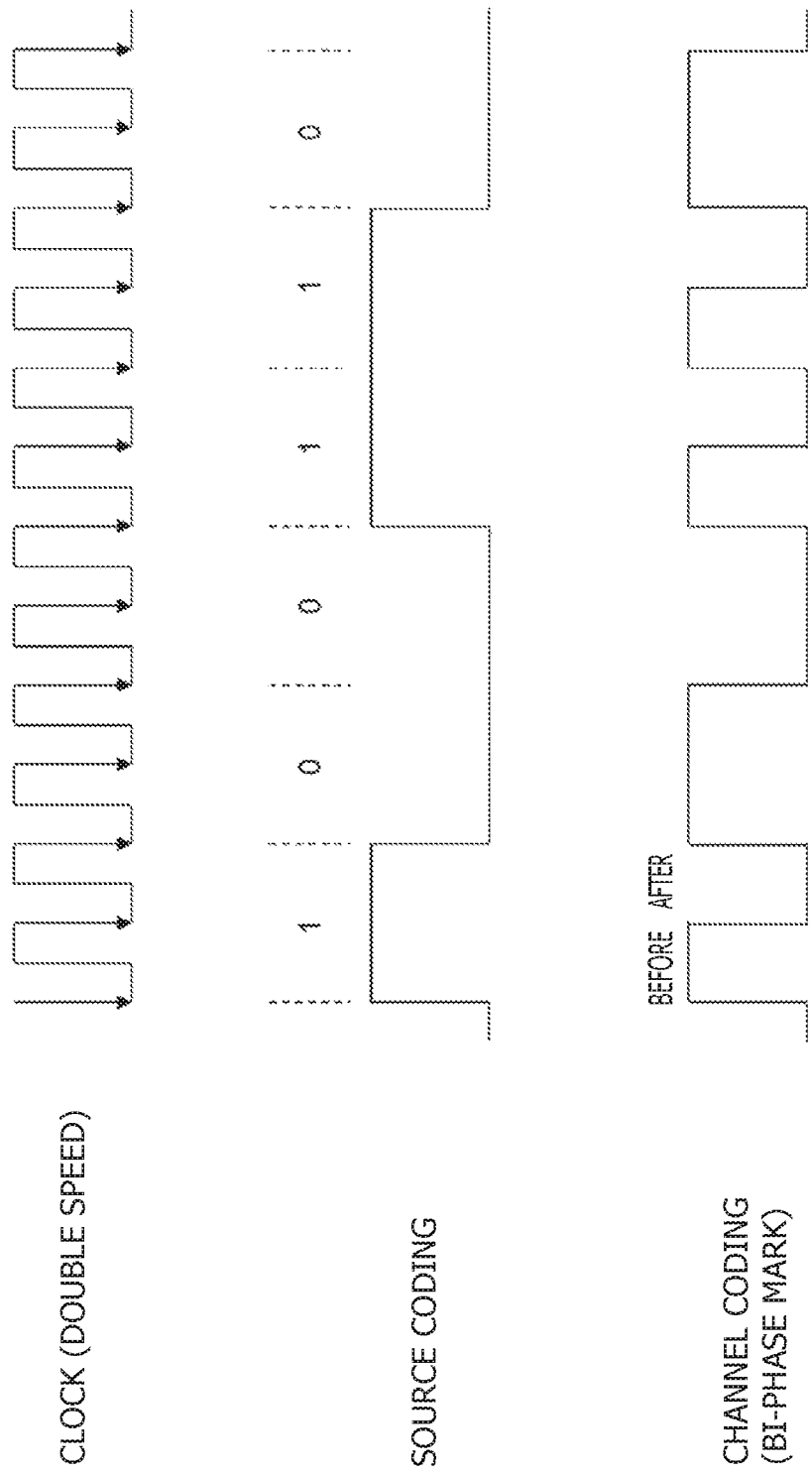

F I G . 1 5

| PREAMBLE | CHANNEL CODING | | |
|---|---|---|---|
| | | | SUB-FRAME #1, BLOCK START |
| "B" | 11101000 | 00010111 | |
| | | | SUB-FRAME #1 |
| "M" | 11100010 | 00011101 | |
| | | | SUB-FRAME #2 |
| "W" | 11100100 | 00011011 | |
| | 0 | 1 | |
| | (JUST PREVIOUS STATE) | | |

FIG. 18

| | 7 | 6 | 5 | 4 | 3 | 2 | 1 | 0 |
|---|---|---|---|---|---|---|---|---|
| IU 1 | 1 (Start) | 0 | \multicolumn{4}{c|}{IEC 60958 Frame Rate} | \multicolumn{2}{c|}{Audio sampling Frequency coefficient} |
| IU 2 | 1 (Start) | 0 | \multicolumn{4}{c|}{Original sampling frequency} | \multicolumn{2}{c|}{Data Type} |
| IU 3 | 1 (Start) | 0 | \multicolumn{2}{c|}{Audio sampling Frequency coefficient} | \multicolumn{4}{c|}{Data Type} |
| IU 4 | 1 (Start) | 0 | 0 | 0 | 0 | 0 | 0 | 0 |

F I G. 25

| | 7 | 6 | 5 | 4 | 3 | 2 | 1 | 0 |
|---|---|---|---|---|---|---|---|---|
| iU 1 | 1 (Start) | 0 | | IEC 60958 Frame Rate | | | | |
| iU 2 | 1 (Start) | 0 | Original sampling frequency | | | | Audio sampling Frequency coefficient | |
| iU 3 | 1 (Start) | 0 | Audio sampling Frequency coefficient | | | Data Type | | |
| iU 4 | 1 (Start) | 0 | | Data Type | | | ENCRYPTION MODE | |
| iU 5 | 1 (Start) | 0 | | | TIME CODE | | | |
| iU 6 | 1 (Start) | 0 | | | TIME CODE | | | |
| iU 7 | 1 (Start) | 0 | | | TIME CODE | | | |
| iU 8 | 1 (Start) | 0 | | | TIME CODE | | | |
| iU 9 | 1 (Start) | 0 | | | TIME CODE | | | |
| iU 10 | 1 (Start) | 0 | | | TIME CODE | | | |
| iU 11 | 1 (Start) | 0 | | | TIME CODE | | | |
| iU 12 | 1 (Start) | 0 | | | TIME CODE | | | |
| iU 13 | 1 (Start) | 0 | | | TIME CODE | | | |
| iU 14 | 1 (Start) | 0 | | TIME CODE | | | | |
| iU 15 | 1 (Start) | 0 | 0 | 0 | 0 | 0 | 0 | 0 |
| iU 16 | 1 (Start) | 0 | 0 | 0 | 0 | 0 | 0 | 0 |

US 10,504,552 B2

TRANSMISSION DEVICE, TRANSMISSION METHOD, RECEPTION DEVICE, AND RECEPTION METHOD

CROSS REFERENCE TO RELATED APPLICATIONS

This application is a U.S. National Phase of International Patent Application No. PCT/JP2016/075372 filed on Aug. 30, 2016, which claims priority benefit of Japanese Patent Application No. JP 2015-175394 filed in the Japan Patent Office on Sep. 7, 2015. Each of the above-referenced applications is hereby incorporated herein by reference in its entirety.

TECHNICAL FIELD

This invention relates to a transmission device, a transmission method, a reception device, and a reception method, and more particularly to a transmission device, a reception device or the like which transmits and receives an LPCM signal/compression digital audio signal.

BACKGROUND ART

In a next-generation television broadcasting, MPEG-4 AAC is used, there are 2 channel, 5.1 channel and the like in terms of the number of audio channels. An apparatus which cannot reproduce 5.1 channel imposes a signal of 5.1 channel on a digital output to send the resulting signal to an audio amplifier. Multi-channel audio reproduction is carried out in the audio amplifier.

As a digital output method standards, IEC 61937-11 is applied. IEC 61937 is the standard in accordance with which compression audio data obtained by being packetized on IEC 60958-3 is transmitted, and IEC 61937-11 regulates a transmission method complying with MPEG-4 AAC. In the transmission complying with MPEG-4 AAC used in the television broadcasting, both 2 channel and 5.1 channel are compressed, and thus they are outputted at the same transmission rate as that of LPCM 48 kHz 2 channel regulated in IEC 60958-3.

Moreover, in the next-generation television broadcasting, MPEG-4 ALS is newly adopted. Then, since ALS itself is lossless compression CODEC, a data rate thereof increases. Although the data is transmitted by applying IEC 61937-10 standard, the data is outputted at the transmission rate of 96 kHz which is twice the past transmission rate.

Therefore, it is feared that at the time of switching of the transmission format from MPEG-4 AAC to MPEG-4 ALS, an allophone is generated, and head omission of a sound of content occurs. This results from that since the transmission rate is changed from 48 kHz to 96 kHz, it takes time for PLL to follow the change, and since the compression format is changed from AAC to ALS, it takes a lot of time for the audio decoder to be necessary for being changed. In addition, likewise, there is the similar fear at the time of changing from the LPCM signal having 48 kHz to the ALS signal.

Although PTL 1 describes an example in which a signal format is notified by using a command in an IEEE1394 interface, since IEC 60958 itself has no command communication path, the command cannot be applied. In addition, although PTL 2 proposes a method of notifying the following format by similarly using invalid data in the IEEE1394 interface, this is not useful in the case where a transmission frequency differs depending on the formats, and it takes time for PLL to carry out the relocking.

CITATION LIST

Patent Literature

[PTL 1]
  JP 2003-289304A
[PTL 2]
  European Published Patent No. EP1432175

SUMMARY

Technical Problem

An object of the present technique is to switch a plurality of kinds of LPCM signals/compression digital audio signals over to one another in transmission, thereby enabling audio reproduction to be satisfactorily carried out.

Solution to Problem

A concept of the present technique lies in a transmission device provided with:
a transmission portion configured to transmit a digital audio signal to an external apparatus through a predetermined transmission path; and
an information adding portion configured to add information associated with a digital audio signal to be next transmitted to the digital audio signal which is currently transmitted.

In the present technique, the transmission portion transmits the digital audio signal to the external apparatus through the predetermined transmission path. Then, the information adding portion adds the information associated with the digital audio signal to be next transmitted to the digital audio signal which is currently transmitted.

For example, first metadata exhibiting a transmission frequency of the digital audio signal, and second metadata exhibiting a data type of the digital audio signal may be contained in the information. In this case, for example, third metadata exhibiting a sampling frequency used during the conversion into an analog signal, and fourth metadata exhibiting a ratio of the transmission frequency to the sampling frequency may be further contained in the information.

For example, time information exhibiting a transmission start timing of the digital audio signal to be next transmitted may be contained in the information. In this case, for example, the time information may be a time code exhibiting time of the transmission start timing. In addition, in this case, for example, the time information may be information exhibiting a time until the transmission start timing. In addition, for example, information exhibiting a mode of encryption when the digital audio signal is encrypted to be transmitted may be contained in the information.

For example, the transmission device may further include a broadcasting receiving portion configured to obtain a digital audio signal from a received broadcasting signal. The information adding portion may acquire information from the broadcasting signal. In addition, for example, the transmission device may further include a medium reading portion which can read out and obtain the digital audio signal from a medium. The information adding portion may acquire the information from the medium.

The transmission portion transmits the digital audio signal to which the information is added to the external apparatus through the predetermined transmission path. For example, the transmission portion may successively transmit the digital audio signal every unit data, and the information adding portion may add the information by using a user data bit of the predetermined number of continuous unit data.

For example, the transmission portion may start the transmission of the digital audio signal to be next transmitted at a time point after a given time elapses from a time point of end of the transmission of the digital audio signal which is currently being transmitted. For example, the predetermined transmission path may be a coaxial cable, an optical cable, an Ethernet (IEC 61883-6) cable, an HDMI cable, an MHL cable or a display port cable.

In such a way, in the present technique, the information associated with the digital audio signal to be next transmitted is added to the digital audio signal which is currently being transmitted, and the resulting signal is transmitted. For this reason, a plurality of kinds of LPCM signals/compression digital audio signals can be switched over to one another in transmission, and the audio reproduction can be satisfactorily carried out.

In addition, the other concept of the present technique lies in a reception device, including:

a reception portion configured to receive a digital audio signal from an external apparatus through a predetermined transmission path; and a processing portion configured to process the digital audio signal, in which information associated with a digital audio signal to be next received is added to a digital audio signal which is currently received, and the processing portion processes the digital audio signal to be next received based on the information.

In the present technique, the reception portion receives the digital audio signal from the external apparatus through the predetermined transmission path. Then, the processing portion processes the digital audio signal. For example, the predetermined transmission path may be a coaxial cable, an optical cable, an Ethernet (IEC 61883-6) cable, an HDMI cable, an MHL cable or a display port cable. The information associated with the digital audio signal which is to be next received is added to the digital audio signal which is currently being received. The processing portion processes the digital audio signal which is to be next received based on the information added to the digital audio signal which is currently being received.

For example, first metadata exhibiting a transmission frequency of the digital audio signal, and second metadata exhibiting a data type of the digital audio signal may be contained in the information. The processing portion may lock a PLL to a frequency corresponding to the transmission frequency exhibited by the first metadata, and may execute the processing corresponding to the data type exhibited by the second metadata for the following digital audio signal by using a clock signal having the frequency to which the PLL is locked.

For example, the processing portion may start preparation for processing the digital audio signal which is to be next received based on the information from a time point at which the information added to the digital audio signal which is currently being received is extracted. In addition, for example, the processing portion may also start the preparation for processing the digital audio signal which is to be next received based on the information from a time point of end of the transmission of the current digital audio signal after the information added to the digital audio signal which is currently being received is extracted from a time point of end of transmission of the current digital audio signal.

In such a way, in the present technique, the digital audio signal which is to be next received is processed based on the information added to the digital audio signal which is currently being received. For this reason, a plurality of kinds of LPCM signals/compression digital audio signals can be switched over to one another in transmission, and the audio reproduction can be satisfactorily carried out.

Advantageous Effect of Invention

According to the present technique, a plurality of kinds of LPCM signals/compression digital audio signals can be switched over to one another in transmission, and the audio reproduction can be satisfactorily carried out. It should be noted that the effect described in this description is merely the exemplification, and is by no means limited thereby, and additional effect(s) may also be offered.

BRIEF DESCRIPTION OF DRAWINGS

FIG. 3 is a block diagram depicting an example of a configuration of an audio amplifier constituting the AV system.

FIGS. 4(a) and 4(b) are diagrams depicting an example of display of a transmission frequency, a sampling frequency, and the like.

FIGS. 5(a) and 5(b) are diagrams depicting an example of display of a transmission frequency, a sampling frequency, and the like.

FIG. 9 is a diagram depicting a pin arrangement of an HDMI connector.

FIG. 12 is a diagram depicting a frame structure in IEC 60958 standards.

FIG. 14 is a timing chart depicting a signal modulation system in the IEC 60958 standards.

FIG. 15 is a diagram depicting channel coding of preamble in the IEC 60958 standard.

FIG. 18 is a diagram depicting an example of a structure of a user data message.

FIG. 25 is a diagram depicting another example of a structure of the user data message.

DESCRIPTION OF EMBODIMENT

Hereinafter, a mode for carrying out the invention (hereinafter referred to as "an embodiment") will be described. It should be noted that the description is given in the following order.

1. Embodiment
2. Modified Changes
<1. Embodiment>
[Example of Configuration of AV System]

Figure 1:
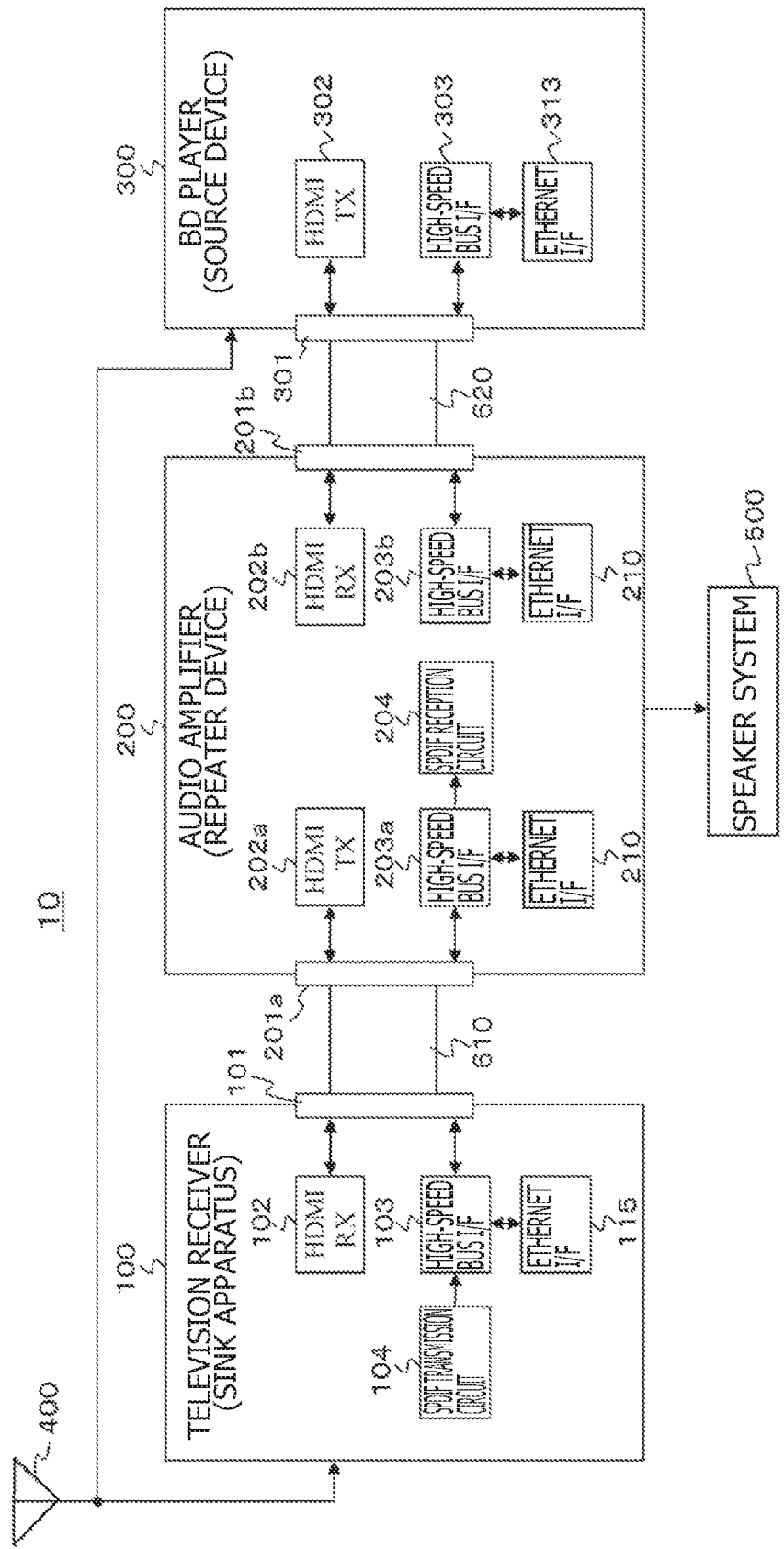
FIG. 1 is a block diagram depicting an example of a configuration of an AV system as an embodiment.

FIG. 1 depicts an example of a configuration of an AV system 10 as an embodiment. The AV system 10 has a television receiver 100 as a sink apparatus, an audio amplifier 200 as a repeater device, and a Blu-Ray Disc (BD) player 300 as a source device. A reception antenna 400 for a television broadcasting is connected to the television receiver 100 and the BD player 300. In addition, a speaker system 500 for either 2 channel or multi-channel is connected to the audio amplifier 200.

The television receiver 100 and the audio amplifier 200 are connected to each other through an HDMI cable 610. The television receiver 100 is provided with an HDMI terminal 101 to which an HDMI reception portion (HDMI RX) 102 and a high-speed bus interface 103 constituting a communication portion are each connected. It should be noted that "HDMI" is the registered trademark.

In addition, the audio amplifier 200 is provided with an HDMI terminal 201a to which an HDMI transmission portion (HDMI TX) 202a, and the high-speed bus interface 203a constituting the communication portion are each connected. One end of the HDMI cable 610 described above is connected to the HDMI terminal 101 of the television receiver 100, and the other end the HDMI cable 610 is connected to the HDMI terminal 201a of the audio amplifier 200.

In addition, the audio amplifier 200 and the BD player 300 are connected to each other through an HDMI cable 620. The audio amplifier 200 is provided with an HDMI terminal 201b to which an HDMI reception portion (HDMI RX) 202b, and the high-speed bus interface 203b constituting the communication portion are each connected.

In addition, the BD player 300 is provided with an HDMI terminal 301 to which an HDMI transmission portion (HDNI TX) 302, and a high-speed bus interface 303 constituting the communication portion are each connected. One end of the HDMI cable 620 described above is connected to the HDMI terminal 201b of the audio amplifier 200, and the other end the HDMI cable 620 is connected to the HDMI terminal 301 of the BD player 300.

[Example of Configuration of Television Receiver]

Figure 2:
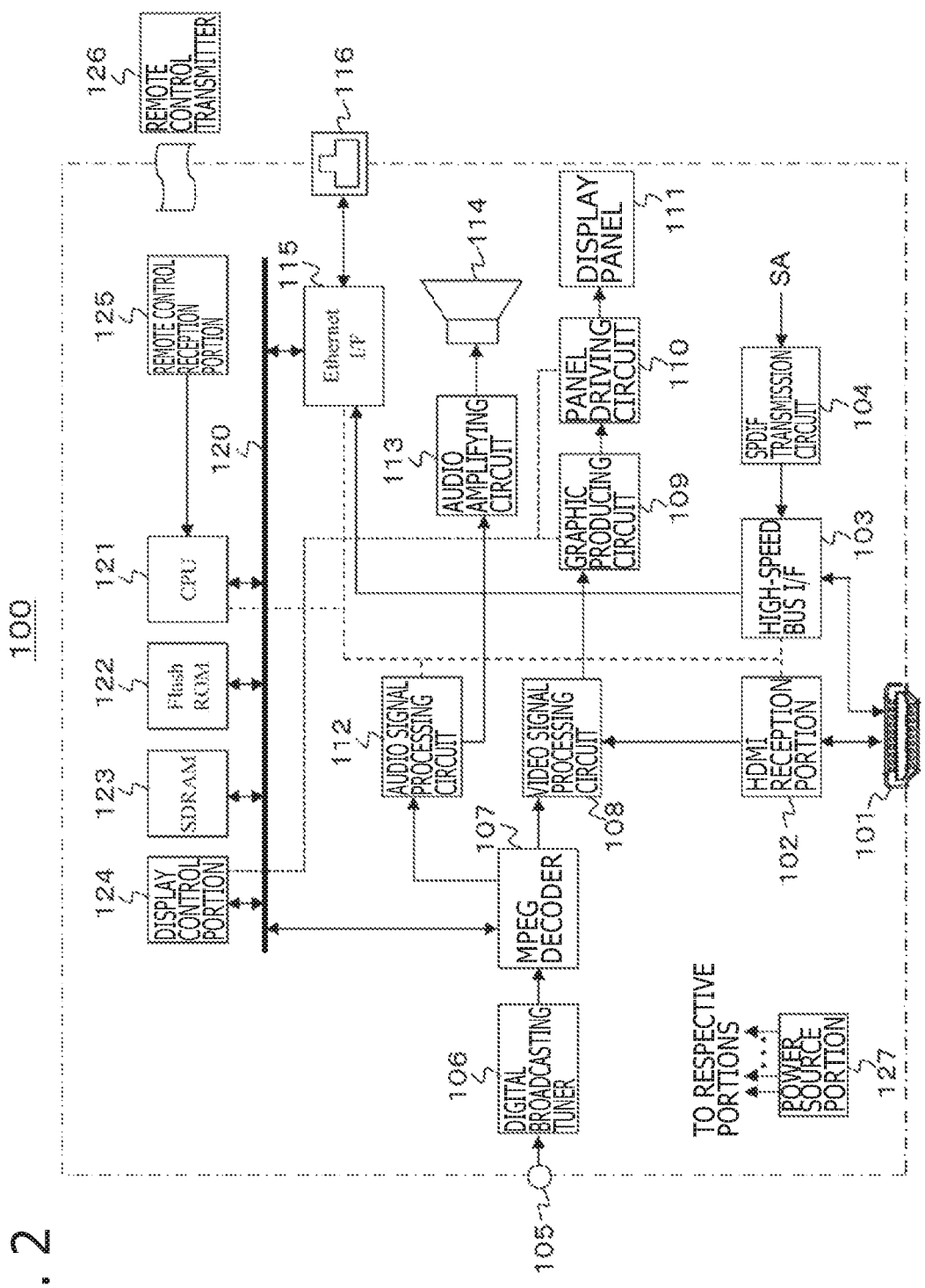
FIG. 2 is a block diagram depicting an example of a configuration of a television receiver constituting the AV system.

FIG. 2 depicts an example of a configuration of the television receiver 100. The television receiver 100 has the HDMI terminal 101, the HDMI reception portion 102, the high-speed bus interface 103, and a Sony Philips Digital Interface (SPDIF) transmission circuit 104. In addition, the television receiver 100 has an antenna terminal 105, a digital broadcasting tuner 106, an MPEG decoder 107, a video signal processing circuit 108, a graphic producing circuit 109, a panel driving circuit 110, and a display panel 111.

In addition, the television receiver 100 also has an audio signal processing circuit 112, an audio amplifying circuit 113, a speaker 114, an Ethernet I/F 115, and a network terminal 116. In addition, the television receiver 100 also has an internal bus 120, a CPU 121, a flash ROM 122, a Synchronous RAM (SDRAM) 123, a display control portion 124, a remote control reception portion 125, a remote control transmission portion 126, and a power source portion 127. It should be noted that "Ethernet" and "Ethernet" are both registered trademarks.

The CPU 121 controls operations of the respective portions of the television receiver 100. The flash ROM 122 carries out the storage of control software, and the storage of the data. The SDRAM 123 constitutes a work area of the CPU 121. The CPU 121 develops the software or data read out from the flash ROM 122 on the SDRAM 123 to activate the software, thereby controlling the respective portions of the television receiver 100.

The remote control reception portion 125 receives a remote control signal (remote control code) transmitted thereto from the remote control transmission portion 126, and supplies the remote control signal to the CPU 121. The CPU 121 controls the respective portions of the television receiver 100 based on the remote control code. It should be noted that although in the embodiment, the remote control portion is illustrated as a user instruction inputting portion, the user instruction inputting portion may have other configuration, for example, may also be a touch panel portion for carrying out an instruction input through proximity/touch, a mouse, a keyboard, a gesture inputting portion for detecting an instruction input by a camera, an audio inputting portion for carrying out an instruction input through a voice or the like.

The antenna terminal 105 is a terminal through which a television broadcasting signal received at the reception antenna (not depicted) is inputted. The digital broadcasting tuner 106 processes the television broadcasting signal inputted to the antenna terminal 105 to extract a partial Transport Stream (TS) (a TS packet for the video data, a TS packet for the audio data) from a predetermined transport stream corresponding to a channel selected by a user.

In addition, the digital broadcasting tuner 106 fetches out Program Specific Information/Service Information (PSI/SI) from the resulting transport stream, and outputs the PSI/SI to the CPU 121. Processing for extracting the partial TS of an arbitrary channel from a plurality of transport streams obtained in the digital broadcasting tuner 106 can be executed by obtaining a packet ID (PID) of the arbitrary channel from the PSI/SI (PAT/PMT).

The MPEG decoder 107 executes decoding processing for a video Packetized Elementary Stream (PES) packet constituted by the TS packet for the video data obtained in the digital broadcasting tuner 106, thereby obtaining the image data. In addition, the MPEG decoder 107 executes decoding processing for the audio PES packet constituted by the TS packet for the audio data obtained in the digital broadcasting tuner 106, thereby obtaining the audio data. It should be noted that the similar processing is executed even in the case where the broadcasting format is not MPEG TS, but MPEG MMT.

The video signal processing circuit 108 and the graphic producing circuit 109 execute scaling processing (resolution converting processing), superimposition processing for the graphics data, and the like for the image data obtained in the MPEG decoder 107, or the image data received in the HDMI reception portion 102 as may be necessary.

The panel driving circuit 110 drives the display panel 111 based on the video (image) data outputted from the graphic producing circuit 109. The display control portion 124 controls the graphics producing circuit 109 and the panel driving circuit 110, thereby controlling the display in the display panel 111. The display panel 111, for example, is constituted by a Liquid Crystal Display (LCD), a Plasma Display Panel (PDP), an Organic Electro-Luminescence Panel (Organic EL Panel), or the like.

It should be noted that although in the embodiment, the example of having the display control portion 124 in addition to the CPU 121 is illustrated, the CPU 121 may directly control the display in the display panel 111. In addition, the CPU 121 and the display control portion 124 may be configured as one chip or a plurality of cores. The power source portion 127 supplies a power source to the respective portions of the television receiver 100. The power source portion 127 may be either an AC power source or a battery (storage battery or dry battery).

The audio signal processing circuit 112 executes necessary processing such as D/A conversion for the audio data obtained in the MPEG decoder 107. The audio amplifying circuit 113 amplifies the audio signal outputted from the audio signal processing circuit 112, and supplies the resulting signal to the speaker 114. It should be noted that the speaker 114 may be of a monaural type or of a stereo type. In addition, the number of speakers 114 may be one or two or more. In addition, the speaker 114 may be an earphone or a headphone. In addition, the speaker 114 may be one corresponding to 2.1 channel, 5.1, 7.1, 22.2 channel, or the like. In addition, the speaker 114 may be one which is wirelessly connected to the television receiver 100. Moreover, the speaker 114 may be another device.

The network terminal 116 is a terminal connected to the network, and thus is connected to the Ethernet interface 115. The CPU 121, the flash ROM 122, the SDRAM 123, the Ethernet interface 115, and the display control portion 124 are each connected to the internal bus 120.

The HDMI reception portion (HDMI sink) 102 receives the data, on the video (image) and the audio in the base band, which is supplied to the HDMI terminal 101 through the HDMI cable through the communication complying with HDMI. The high-speed bus interface 103 is an interface of a bi-directional communication path constituted by using a reserve line and an HPD line constituting the HDMI cable. The details of the HDMI reception portion 102 will be described later.

The SPDIF transmission circuit 104 is a circuit for transmitting the digital audio transmission signal (hereinafter suitably referred to as "the SPDIF signal") complying with the IEC 60958 standards and containing the digital audio signal (LPCM signal/compression digital audio signal) SA. The SPDIF transmission circuit 104 is a transmission circuit complying with the IEC 60958 standards.

In the embodiment, the SPDIF transmission circuit 104 produces the SPDIF signal containing the digital audio signal SA of 2 channel, 5.1 channel or the like. The digital audio signal SA, for example, is a compression digital audio signal complying with MPEG-4 AAC, a compression digital audio signal complying with MPEG-4 ALS, or the like which is acquired from the broadcasting signal by the digital broadcasting tuner 106.

In addition, in the embodiment, the SPDIF transmission circuit 104 adds information, of an audio format or the like, on the digital audio signal SA which is to be next transmitted to the digital audio signal SA which is currently being transmitted. First metadata exhibiting the transmission frequency of the digital audio signal, and second metadata exhibiting the data type of the digital audio signal are contained in this information. In addition, third metadata exhibiting the sampling frequency used when the signal is converted into the analog signal, and fourth metadata exhibiting a ratio of the transmission frequency to the sampling frequency are further contained in this information.

In addition, time information exhibiting a timing of start of the transmission of the digital audio signal SA to be next transmitted is contained in this information. For example, this time information is a time code exhibiting time of the timing of start of the transmission, or information exhibiting a time until the timing of start of the transmission. In addition, information exhibiting a mode of encryption when the digital audio signal SA is encrypted and is transmitted is contained in this information. Incidentally, the details of the SPDIF signal will be described later.

The high-speed bus interface 103 is inserted between the Ethernet interface 115 and the HDMI terminal 101. The high-speed bus interface 103 supplies the reception data received from the apparatus on a side of a party through the HDMI terminal 101 from the HDMI cable to the CPU 121 through the Ethernet interface 115.

In addition, the high-speed bus interface 103 transmits the transmission data supplied through the Ethernet interface 115 from the CPU 121 to the apparatus on the side of the party through the HDMI cable from the HDMI terminal 101. In addition, the high-speed bus interface 103 transmits the SPDIF signal produced in the SPDIF transmission circuit 104 to the apparatus on the side of the party through the HDMI cable from the HDMI terminal 101. Incidentally, the details of the high-speed bus interface 103 will be described later.

It should be noted that when, for example, the received content data is sent to the network, the content data is outputted to the network terminal 116 through the Ethernet interface 115. Likewise, when the received content data is sent to the bidirectional communication path of the HDMI cable, the content data concerned is outputted to the HDMI terminal 101 through the Ethernet interface 115 and the high-speed bus interface 103. Here, before the image data is outputted, the image data may be encrypted for transmission by using the copyright protection technology such as HDCP, DTCP, or DTCP+.

An operation of the television receiver 100 depicted in FIG. 2 will now be described in brief. The television broadcasting signal inputted to the antenna terminal 105 is supplied to the digital broadcasting tuner 106. The digital broadcasting tuner 106 processes the television broadcasting signal and a predetermined transport stream corresponding to the channel selected by the user is outputted. Then, the partial TS (TS packet for video data, TS packet for audio data) is extracted from the transport stream, and is supplied to the MPEG decoder 107. When the television broadcasting signal is of an MMT format, the audio data is of an LATM/LOAS format.

The MPEG decoder 107 executes the decoding processing for a video PES packet constituted by the TS packet for the video data, thereby obtaining the video data. After the video signal processing circuit 108 and the graphic producing circuit 109 execute the scaling processing (resolution converting processing), the superimposition processing for the graphics data, and the like for the video data as may be necessary, the resulting video data is supplied to the panel driving circuit 110. For this reason, the image corresponding to the channel selected by the user is displayed on the display panel 111.

In addition, the MPEG decoder 107 executes the decoding processing for the audio PES packet constituted by the TS packet for the audio data, thereby obtaining the audio data. The necessary processing such as D/A conversion is executed for the audio data in the audio signal processing circuit 112, and after the resulting audio data is amplified by the audio amplifying circuit 113, it is supplied to the speaker 114. For this reason, the voice corresponding to the channel selected by the user is outputted from the speaker 114. When the audio data is of the LATM/LOAS format, the decoding processing is executed in accordance with the LATM/LOAS format.

In addition, the content data (image data, audio data) which is either supplied to the Ethernet interface 115 from the network terminal 116 or supplied to the Ethernet interface 115 through the high-speed bus interface 103 from the HDMI terminal 101 is supplied to the MPEG decoder 107. Subsequently, the operation becomes the similar operation to that at the time of reception of the television broadcasting signal described above: the image is displayed on the display panel 111; and the voice is outputted from the speaker 114.

In addition, the HDMI reception portion 102 acquires the image data and the audio data which are transmitted to the HDMI terminal 101 through the HDMI cable. Then, the image data is supplied to the video signal processing circuit 108. In addition, the audio data is supplied to the audio signal processing circuit 112. Subsequently, the operation becomes the similar operation to that at the time of reception of the television broadcasting signal described above: the image is displayed on the display panel 111; and the voice is outputted from the speaker 114.

In addition, the SPDIF signal containing the digital audio signal SA and produced in the SPDIF transmission circuit 104 is supplied to the high-speed bus interface 103. Then, the SPDIF signal is transmitted to the audio amplifier 200 through the HDMI cable 610 from the HDMI terminal 101 by the high-speed bus interface 103.

[Example of Configuration of Audio Amplifier]

FIG. 3 depicts an example of a configuration of the audio amplifier 200. The audio amplifier 200 has HDMI terminals 201a and 201b, an HDMI transmission portion 202a, an HDMI reception portion 202b, high-speed bus interfaces 203a and 203b, and an SPDIF reception circuit 204.

In addition, the audio amplifier 200 also has an MPEG decoder 205, a video/graphic processing circuit 206, an audio processing circuit 207, an audio amplifying circuit 208 and an audio output terminal 209. In addition, the audio amplifier 200 also has an Ethernet interface 210, an internal bus 211, a CPU 212, a flash ROM 213, a DRAM 214, a display control portion 215, a panel driving circuit 216, a display panel 217, a power source portion 218, a remote control reception portion 219, and a remote control transmitter 220.

The CPU 212 controls operations of the respective portions of the audio amplifier 200. The flash ROM 213 carries out the storage of control software, and the safe-keeping of the data. The DRAM 214 constitutes a work area of the CPU 212. The CPU 212 develops the software and the data which are read out from the flash ROM 213 on the DRAM 214 to activate the software, thereby controlling the respective portions of the audio amplifier 200. The CPU 212, the flash ROM 213, the DRAM 214, the Ethernet interface 210, and the display control portion 215 are connected to the internal bus 211.

The remote control reception portion 219 receives a remote control signal (remote control code) transmitted thereto from the remote control transmission portion 220, and supplies the remote control signal to the CPU 212. The CPU 212 controls the respective portions of the audio amplifier 200 based on the remote control code. It should be noted that although in the embodiment, the remote control portion is illustrated as a user instruction inputting portion, the user instruction inputting portion may have other configuration, for example, may also a touch panel portion for carrying out an instruction input through proximity/touch, a mouse, a keyboard, a gesture inputting portion for detecting an instruction input by a camera, an audio inputting portion for carrying out an instruction input through a voice or the like.

The HDMI transmission portion (HDMI source) 202a sends the data on the video (image) and the audio in the base band from the HDMI terminal 201a to the HDMI cable through the communication complying with HDMI. The HDMI reception portion (HDMI sink) 202b receives the data, on the video (image) and the audio in the base band, which is supplied to the HDMI terminal 201b through the HDMI cable through the communication complying with HDMI. The details of the HDMI transmission portion 202a and the HDMI reception portion 202b will be described later.

The high-speed bus interfaces 203a and 203b are interfaces of bi-directional communications each constituted by using a reserve line and an HPD line constituting the HDMI cable. The details of the high-speed bus interfaces 203a and 203b will be described later. The SPDIF reception circuit 204 is a circuit for receiving the SPDIF signal (digital audio signal complying with the IEC 60958 standards). The SPDIF reception circuit 204 is a reception circuit complying with the IEC 60958 standards.

In the embodiment, the SPDIF reception circuit 204 receives the SPDIF signal containing the digital audio signal SA, and outputs the digital audio signal SA. In addition, in the embodiment, the SPDIF reception circuit 204 extracts information added to the digital audio signal SA, and sends the information to the CPU 212.

As described above, the information associated with the digital audio signal SA to be next received is added to the digital audio signal SA which is currently being received. The first metadata exhibiting the transmission frequency of the digital audio signal, and second metadata exhibiting the data type of the digital audio signal are contained in this information. In addition, the third metadata exhibiting the sampling frequency used when the signal is converted to the analog signal, and the fourth metadata exhibiting the ratio of the transmission frequency to the sampling frequency are contained in this information.

In addition, time information exhibiting a timing of start of the following digital audio signal SA is contained in this information. For example, this time information is a time code exhibiting the time of the timing of start of the transmission, or the information exhibiting a time until the timing of start of the transmission. In addition, information exhibiting a mode of encryption when the digital audio signal SA is encrypted is contained in this information.

The MPEG decoder 205 decodes a partial TS which is supplied to the Ethernet interface 210 through the high-speed bus interface 203a. In this case, of the partial TS, the decoding processing is executed for the PES packet of the audio, thereby obtaining a non-compression digital audio signal of 2 channel, 5.1 channel, or the like.

In addition, the MPEG decoder 205 executes the decoding processing for the digital audio signal SA obtained in the SPDIF reception circuit 204, thereby obtaining a non-compression digital audio signal of 2 channel, 5.1 channel, or the like. In this case, the MPEG decoder 205 processes the digital audio signal SA to be next received based on information added to the digital audio signal SA which is currently being received under the control of the CPU 212, thereby obtaining the non-compression digital audio signal.

For example, the PLL is locked to the frequency corresponding to the transmission frequency exhibited by the first metadata, and the processing corresponding to the data type exhibited by the second metadata is executed for the following digital audio signal SA by using the clock signal having the frequency to which the PLL is locked. For example, in the case of the digital audio signal SA, the decoding processing is executed in accordance with a program corresponding to the compression system.

The audio processing circuit 207 executes the necessary processing such as the D/A conversion for the non-compression digital audio signal, of each channel such as 2 channel or 5.1 channel, which is obtained in the MPEG decoder 205, thereby obtaining the analog audio signal of the respective channels. At this time, the audio processing circuit 207 converts the non-compression digital audio signal of the corresponding channel which is obtained by executing the decoding processing for the compression digital audio signal SA into an analog signal with the sampling frequency exhibited by the third metadata.

The audio amplifying circuit 208 amplifies the analog audio signal, of each channel such as 2 channel or multi-channel, which is obtained in the audio processing circuit 207, and outputs the resulting signal to the audio output terminal 209. Incidentally, a speaker system 500 for 2 channel or multi-channel is connected to the audio output terminal 209.

After the audio processing circuit 207 executes the necessary processing for the audio data obtained in the HDMI reception portion 202b, the audio processing circuit 207 supplies the resulting audio data to the HDMI transmission portion 202a. After the video/graphic processing circuit 206 subjects the video (image) data obtained in the HDMI reception portion 202b to the processing such as the superimposition of the graphics data, the video/graphic processing circuit 206 supplies the resulting video (image) data to the HDMI transmission portion 202a.

For example, in order to carry out the user interface display, the status display of the audio amplifier 200, or the like, the display control portion 215 controls the panel driving circuit 216, thereby controlling the display in the display panel 217. The display panel 217, for example, is constituted by a Liquid Crystal Display (LCD), a Plasma Display Panel (PDP), an Organic Electro-Luminescence (EL) Panel, or the like.

In the embodiment, when the audio output pertaining to the digital audio signal SA obtained in the SPDIF reception circuit 204 is carried out, the display panel 217 displays the sampling frequency exhibited by the third metadata as the sampling frequency of the output analog audio signal of the corresponding channel under the control by the display control portion 215 (CPU 212).

In addition, in this case, the display panel 217 carries out the display exhibiting the transmission frequency of the digital audio signal SA by using the transmission frequency exhibited by the first metadata or the ratio exhibited by the fourth metadata under the control of the display control portion 215 (CPU 212).

FIG. 4(b) depicts an example of display in the display panel 217. This example, as depicted in FIG. 4(a), is an example in the case where the compression digital audio signal SA of MPEG-4 AAC of 5.1 channel having the sampling frequency of 48 kHz is transmitted from the television receiver 100 to the audio amplifier 200 at the frequency of 48 kHz.

The display of "48 kHz reproduction" of FIG. 4(b) represents the sampling frequency of the output analog audio signal of the corresponding channel. "48 kHz transmission" or "×1 transmission" indicates the transmission frequency of the compression digital audio signal SA. Here, "48 kHz transmission" is the display using the transmission frequency exhibited by the first metadata, and "×1 transmission" is the display using the ratio exhibited by the fourth metadata.

Figure 5A:
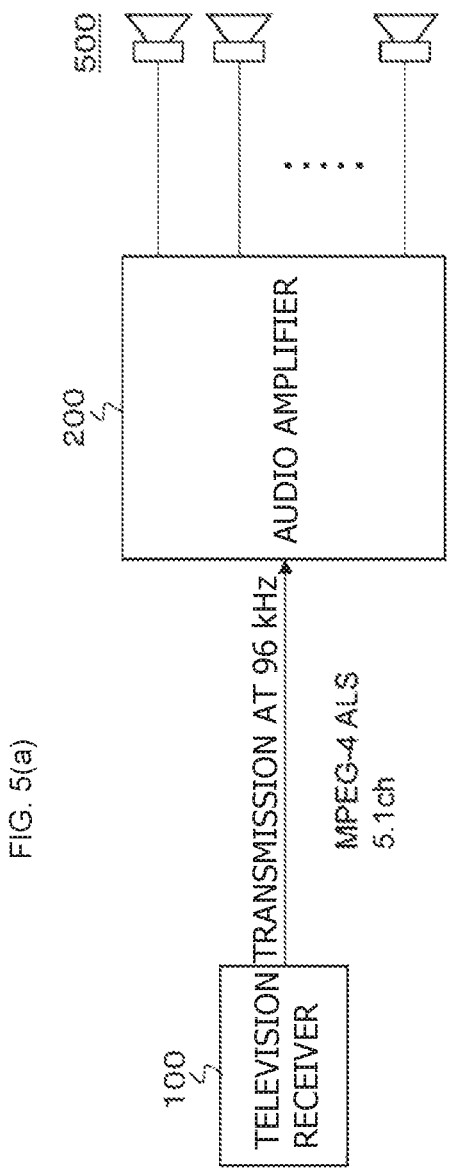
Figure 5B:
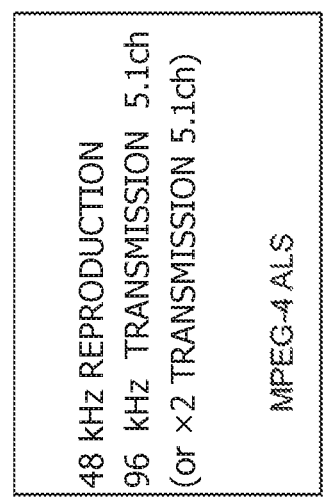

FIG. 5(b) also depicts an example of display in the display panel 217. This example, as depicted in FIG. 5(a), is an example in the case where the compression digital audio signal SA complying with MPEG-4 ALS of 5.1 channel having the sampling frequency of 48 kHz is transmitted from the television receiver 100 to the audio amplifier 200 at the frequency of 96 kHz.

The display of "48 kHz reproduction" of FIG. 5(b) represents the sampling frequency of the output analog audio signal of the corresponding channel. "96 kHz transmission" or "×2 transmission" indicates the transmission frequency of the compression digital audio signal SA. Here, "96 kHz transmission" is the display using the transmission frequency exhibited by the first metadata, and "×2 transmission" is the display using the ratio exhibited by the fourth metadata.

It should be noted that although in the embodiment, the example of having the display control portion 215 in addition to the CPU 212 is illustrated, the CPU 212 may directly control the display in the display panel 217. In addition, the CPU 212 and the display control portion 215 may be configured as one chip or a plurality of cores. The power source portion 218 supplies a power source to the respective portions of the audio amplifier 200. The power source portion 218 may be either an AC power source or a battery (storage battery or dry battery).

An operation of the audio amplifier 200 depicted in FIG. 3 will now be described in brief. The video (image) data and the audio data which are transmitted from the BD player 300 to the HDMI terminal 201b through the HDMI cable 620 are acquired in the HDMI reception portion 202b. The video data and the audio data are supplied to the HDMI transmission portion 202a through the video/graphic processing circuit 206 and the audio processing circuit 207, respectively, and are transmitted to the television receiver 100 through the HDMI cable 610 connected to the HDMI terminal 202a.

The high-speed bus interface 203a receives the partial TS transmitted thereto from the television receiver 100 through a predetermined line of the HDMI cable 610 connected to the HDMI terminal 201a. The partial TS is supplied to the MPEG decoder 205 through the Ethernet interface 211. The MPEG decoder 205 executes the decoding processing for the PES packet of the audio data constituting the partial TS, thereby obtaining the non-compression digital audio signal of the corresponding channel of either 2 channel or the multi-channel.

The non-compression digital audio signal of the corresponding channel is supplied to the audio processing circuit 207, and is subjected to the necessary processing such as the D/A conversion. Then, when the muting is in an OFF state, the analog audio signal of the corresponding channel outputted from the audio processing circuit 207 is amplified and is outputted to the audio output terminal 209. For this reason, the audio output of either 2 channel or the multi-channel is obtained from the speaker system 500.

In addition, the high-speed bus interface 203a receives the SPDIF signal containing the digital audio signal SA which is transmitted thereto from the television receiver 100 through a predetermined line of the HDMI cable 610 connected to the HDMI terminal 201a. The SPDIF signal is supplied to the SPDIF reception circuit 204. The SPDIF reception circuit 204 processes the SPDIF signal to obtain the digital audio signal SA.

The digital audio signal SA is supplied to the MPEG decoder 205. The MPEG decoder 205 executes the decoding processing for the digital audio signal SA, thereby obtaining the non-compression digital audio signal of 2 channel, 5.1 channel or the like.

The non-compression digital audio signal of the corresponding channel is supplied to the audio processing circuit 207, and is subjected to the necessary processing such as the D/A conversion. Then, when the muting is in an OFF state, the analog audio signal of the corresponding channel outputted from the audio processing circuit 207 is amplified and is outputted to the audio output terminal 209. For this reason, the audio output of 2 channel, 5.1 channel or the like is obtained from the speaker system 500.

Incidentally, the partial TSs which are received in the high-speed bus interface 203a and are supplied to the Ethernet interface 210 in the manner as described above are supplied as the transmission data to the high-speed bus interface 203b. For this reason, these partial TSs are transmitted to the BD player 300 through the HDMI cable 620 connected to the HDMI terminal 201b.

[Example of Configuration of BD Player]

Figure 6:
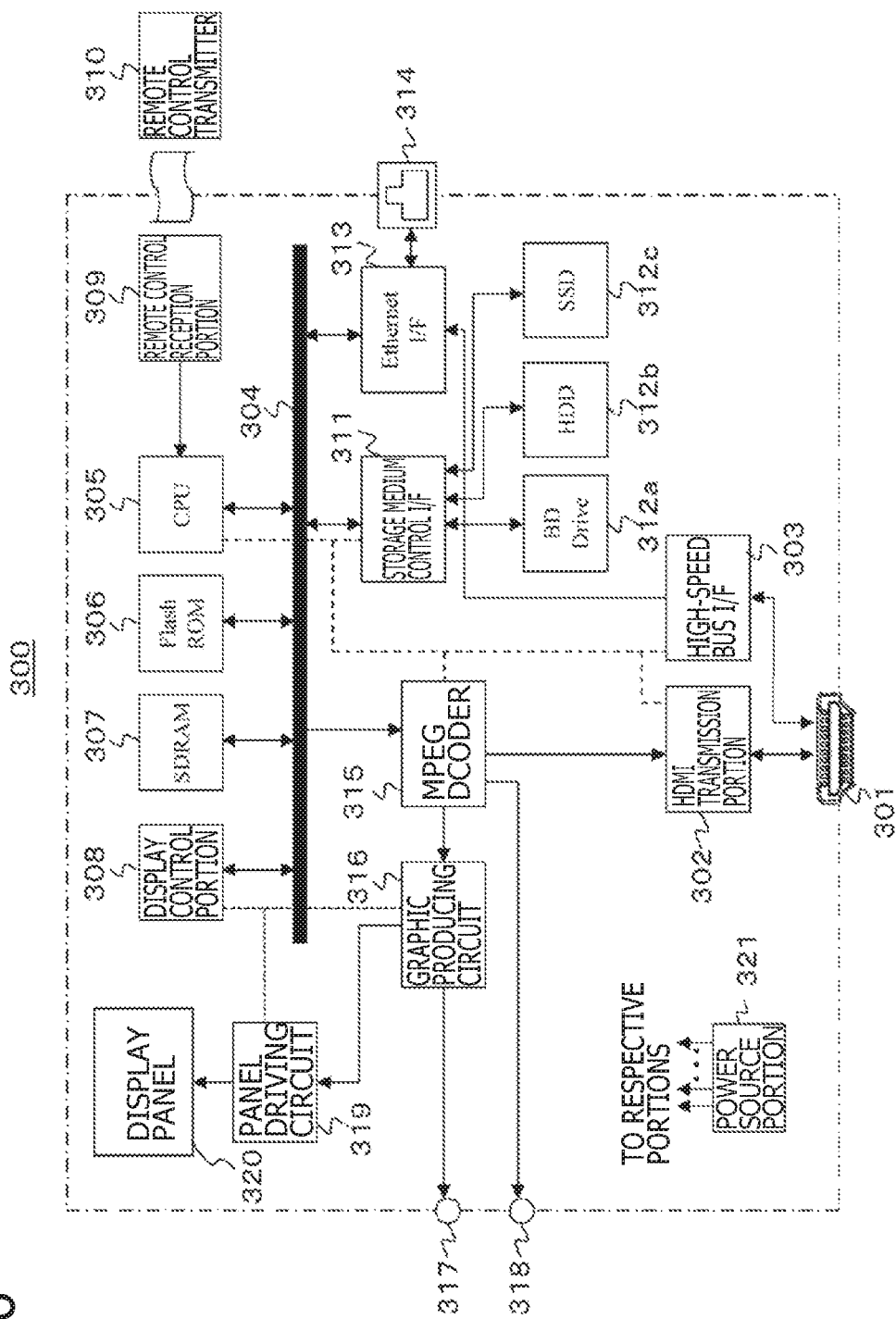
FIG. 6 is a block diagram depicting an example of a configuration of a BD player constituting the AV system.

FIG. 6 depicts an example of a configuration of the BD player 300. The BD player 300 has the HDMI terminal 301, the HDMI transmission portion 302, and the high-speed bus interface 303. In addition, the BD player 300 also has an internal bus 304, a Central Processing Unit (CPU) 305, a flash Read Only Memory (ROM) 306, a Synchronous Random Access Memory (SDRAM) 307, a display control portion 308, a remote control reception portion 309, and a remote control transmitter 310.

In addition, the BD player 300 also has a storage (recording) medium control interface 311, a Blu-Ray Disc (BD) drive 312a, a Hard Disc Drive (HDD) 312b, a Solid State Drive (SSD) 312c, an Ethernet interface (I/F) 313, and a network terminal 314. In addition, the BD player 300 also has a Moving Picture Expert Group (MPEG) decoder 315, a graphic producing circuit 316, a video output terminal 317, and an audio output terminal 318.

In addition, the BD player 300 also has a panel driving circuit 319, a display panel 320, and a power source portion 321. The CPU 305, the flash ROM 306, the SDRAM 307, the storage medium control interface 311, the Ethernet interface 313, and the MPEG decoder 315 are connected to an internal bus 304.

The CPU 305 controls the respective portions of the BD player 300. The flash ROM 306 carries out the storage of control software, and the safe-keeping of the data. The SDRAM 307 constitutes a work area of the CPU 305. The CPU 305 develops the software and data read out from the flash ROM 306 on the SDRAM 307 to activate the software, thereby controlling the respective portions of the BD player 300.

The remote control reception portion 309 receives a remote control signal (remote control code) transmitted thereto from the remote control transmitter 310, and supplies the remote control signal to the CPU 305. The CPU 305 controls the respective portions of the BD player 300 in accordance with the remote control code. It should be noted that although in the embodiment, the remote control portion is illustrated as a user instruction inputting portion, the user instruction inputting portion may have other configuration, for example, may also be a switch, a wheel, a touch panel portion for carrying out an instruction input through proximity/touch, a mouse, a keyboard, a gesture inputting portion for detecting an instruction input by a camera, an audio inputting portion for carrying out an instruction input through a voice, or the like.

The BD drive 312a recodes the content data in the BD disc as the disc-shaped recording medium, a reproduces the content data from the BD disc. The HDD 312b records the content data, or reproduces the content data. The SSD 312c records the content data in the semiconductor memory such as a memory card, or reproduces the content data from the semiconductor memory.

The BD drive 312a, the HDD 312b, and the SSD 312c are each connected to an internal bus 304 through a storage medium control interface 311. For example, a SATA interface is used as the interface for the BD drive 312a or the HDD 312b. In addition, for example, either the SATA interface or a PCIe interface is used as an interface for the SSD 312c.

The MPEG decoder 315 executes the decoding processing for an MPEG2 stream which is reproduced in the BD drive 312a, the HDD 312b, or the SSD 312c, thereby obtaining the data on the image and the voice. The graphic producing circuit 316 executes the superimposing processing or the like for superimposing the graphics data for the image data obtained in the MPEG decoder 315 as may be necessary. The video output terminal 317 outputs the image data which is outputted from the graphic producing circuit 316. The audio data obtained in the MPEG decoder 315 is outputted through the audio output terminal 318.

The panel driving circuit 319 drives the display panel 320 based on the video (image) data outputted from the graphic producing circuit 316. The display control portion 308 controls the display in the display panel 320 by controlling the graphics producing circuit 316 and the video output terminal 319. The display panel 320, for example, is constituted by a Liquid Crystal Display (LCD), a Plasma Display Panel (PDP), a Plasma Display Panel (PDP), an Organic Electro-Luminescence (EL) Panel, or the like.

It should be noted that although in the embodiment, the example of having the display control portion 308 in addition to the CPU 305 is illustrated, the CPU 305 may directly control the display in the display panel 320. In addition, the CPU 305 and the display control portion 308 may be configured as one chip or a plurality of cores. The power source portion 321 supplies a power source to the respective portions of the BD player 300. The power source portion 321 may be either an AC power source or a battery (storage battery or dry battery).

The HDMI transmission portion (HDMI source) 302 sends the data on the image (video) and the voice of the base band from the HDMI terminal 301 through the communication complying with HDMI. The high-speed bus interface 303 is the interface of the bidirectional communication path constituted by using the reserve line and the HPD line constituting the HDMI cable. Incidentally, the details of the HDMI transmission portion 302 will be described later.

The high-speed bus interface 303 is inserted between the Ethernet interface 313 and the HDMI terminal 301. The high-speed bus interface 303 transmits the transmission data supplied thereto from the CPU 305 to the apparatus of the party side through the HDMI cable from the HDMI terminal 301. In addition, the high-speed bus interface 303 supplies the reception data received from the apparatus of the party side through the HDMI terminal 301 from the HDMI cable to the CPU 305. Incidentally, the details of the high-speed bus interface 303 will be described later.

An operation of the BD player 300 depicted in FIG. 6 will be described in brief. At the time of the recording, the content data to be recorded is acquired through a digital broadcasting tuner (not depicted), or through the Ethernet interface 311 from the network terminal 314, or through the high-speed bus interface 303 from the HDMI terminal 301. The content data is inputted to the storage medium control interface 311, and is either recorded in the BD disc by the BD drive 312a, or recorded in the semiconductor memory by the HDD 312b or the SSD 312c.

At the time of the reproduction, the content data (MPEG stream) which is reproduced by the BD drive 312a, the HDD 312b, or the SSD 312c is supplied to the MPEG decoder 315 through the storage medium control interface 311. The MPEG decoder 315 executes the decoding processing for the reproduced content data, thereby obtaining the data on the image and the voice of the base band. The image data is outputted to the video output terminal 317 through the graphic producing circuit 316. In addition, the audio data is outputted to the audio output terminal 318.

In addition, at the time of the reproduction, the image data obtained in the MPEG decoder 315 is supplied to the panel driving circuit 319 through the graphic producing circuit 316 in accordance with a user operation, so that the reproduced image is displayed on the display panel 320. In addition, the audio data obtained in the MPEG decoder 315 is supplied to a speaker (not depicted) in accordance with a user operation, so that the voice corresponding to the reproduced image is outputted.

In addition, at the time of the reproduction, when the data on the image and voice which is obtained in the MPEG decoder 315 is transmitted through the TMDS channel of the HDMI, these pieces of data on the image and voice are supplied to the HDMI transmission portion 302 to be subjected to packing, and the resulting data is outputted from the HDMI transmission portion 302 to the HDMI terminal 301.

In addition, at the time of the reproduction, when the content data obtained through the reproduction by the BD drive 312a, the HDD 312b, or the SSD 312c is sent to the network, the content data is outputted to the network terminal 314 through the Ethernet interface 313. Likewise, at the time of the reproduction, when the content data obtained through the reproduction by the BD drive 312a, the HDD 312b, or the SSD 312c is sent to the bidirectional communication path of the HDMI cable 620, the content data is outputted to the HDMI terminal 301 through the high-speed bus interface 303. Here, before the image data is outputted, the image data may be encrypted for transmission by using the copyright protection technology such as HDCP, DTCP, or DTCP+.

[Example of Configuration of HDMI Transmission Portion/Reception Portion]

Figure 7:
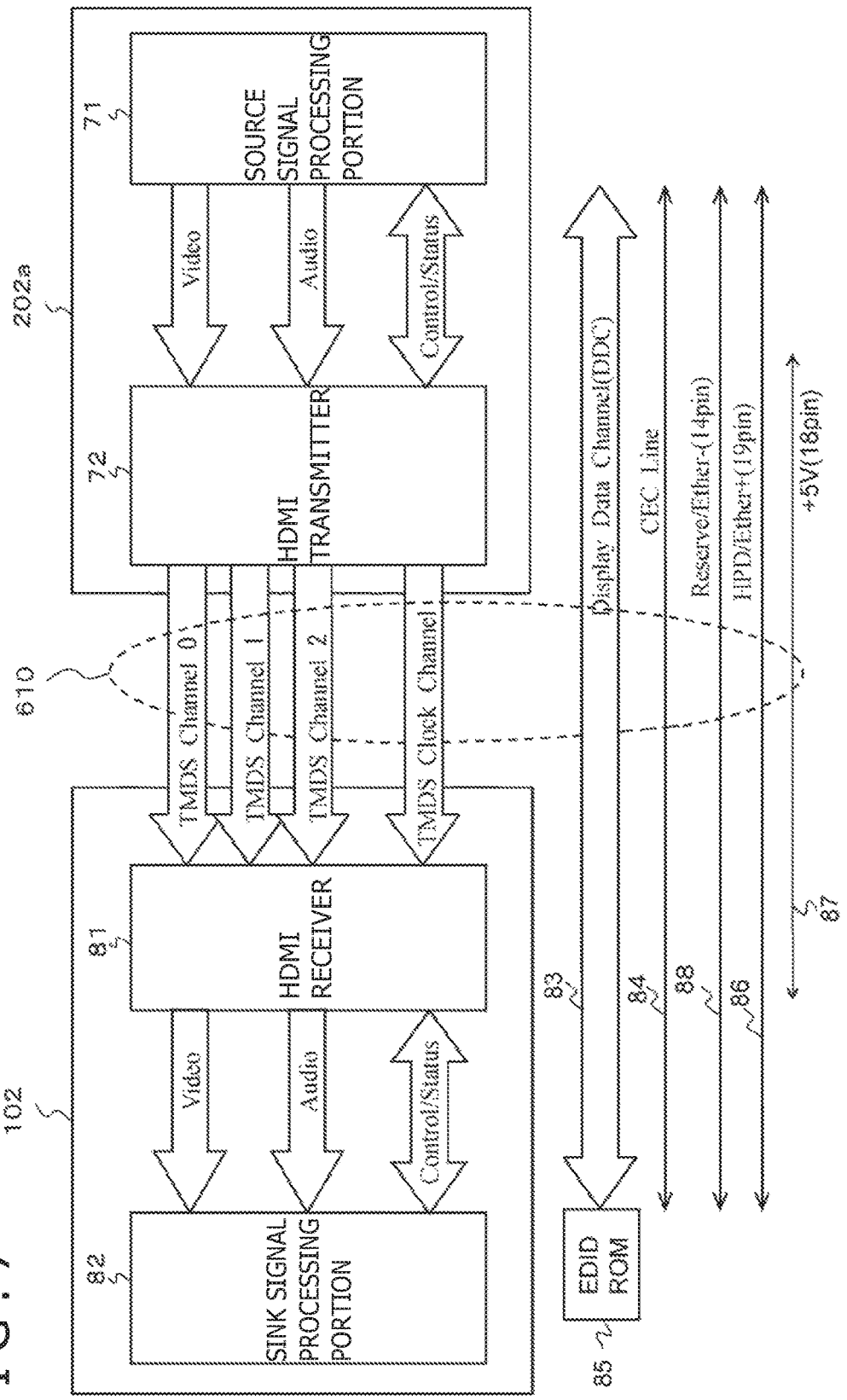
FIG. 7 is a block diagram depicting an example of a configuration of an HDMI reception portion of the television receiver, and an HDMI transmission portion of an audio amplifier.

FIG. 7 depicts an example of a configuration of the HDMI reception portion 102 of the television receiver 100, and the HDMI transmission portion 202a of the audio amplifier 200 in the AV system 10 in FIG. 1. It should be noted that an example of a configuration of the HDMI reception portion 202b of the audio amplifier 200, and the HDMI transmission portion 302 of the BD player 300 are similar to that of the above case, and thus a description thereof is omitted here.

The HDMI transmission portion 202a transmits a differential signal of the image data for one picture of the base band (non-compression) to the HDMI reception portion 102 in a unidirectional direction through a plurality of channels in a period ranging from a certain vertical synchronous signal to a next vertical synchronous signal (hereinafter suitably referred to as "a video field") to a valid image period as a period except for a horizontal blanking period and a vertical blanking period (hereinafter suitably referred to as "an active video period"). In addition, the HDMI transmission portion 202a transmits a differential signal corresponding to the audio data and a Control Packet following the image data, other auxiliary data, and the like to the HDMI reception portion 102 in a unidirectional direction through a plurality of channels in the horizontal blanking time period and the vertical blanking time period.

The HDMI transmission portion 202a has a source signal processing portion 71 and an HDMI transmitter 72. The data on the non-compression Video and Audio in the base band is supplied to the source signal processing portion 71. The source signal processing portion 71 executes necessary processing for the data on the image or video and audio supplied thereto, and supplies the resulting data to the HDMI transmitter 72. In addition, the source signal processing portion 71 exchanges information for control, information notifying a status (Control/Status), and the like with the HDMI transmitter 72 as may be necessary.

The HDMI transmitter 72 converts the image data supplied thereto from the source signal processing portion 71 into the corresponding differential signal, and transmits the resulting differential signal to the HDMI reception portion 102 connected thereto via the HDMI cable 610 in a unidirectional direction through three TMDS channels #0, #1, #2 as a plurality of channels.

Moreover, the transmitter 72 converts the audio data, the control packet and other auxiliary data, following the nom-compression image data, which are supplied thereto from the source signal processing portion 71, and the control data such as a vertical synchronous signal (VSYNC), a horizontal synchronous signal (HSYNC) into a corresponding differential signal, and transmits the resulting differential signal to the HDMI reception portion 102 connected thereto via the HDMI cable 610 through the three TMDS channels #0, #1, #2 in a unidirectional direction.

In addition, the transmitter 72 transmits a pixel clock synchronized with the image data which is transmitted through the three TMDS channels #0, #1, #2 to the HDMI reception portion 102 connected thereto in a TMDS clock channel through the HDMI cable 610.

The HDMI reception portion 102 receives a differential signal corresponding to the image data, which is transmitted thereto from the HDMI transmission portion 202a in a unidirectional direction through a plurality of channels in the active video period. The HDMI reception portion 102 also receives a differential signal corresponding to the auxiliary data and the control data, which is transmitted thereto from the HDMI transmission portion 202a through a plurality of channels, in the horizontal blanking time period and the vertical blanking time period.

The HDMI reception portion 102 has an HDMI receiver 81 and a sink signal processing portion 82. The HDMI receiver 81 receives the differential signal corresponding to the image data and the differential signal corresponding to the auxiliary data and the control data, which are transmitted thereto from the HDMI transmission portion 202a connected thereto through the HDMI cable 610 in a unidirectional direction in the TMDS channels #0, #1, #2 synchronously with the pixel clock which is similarly transmitted thereto from the HDMI transmission portion 202a in the TMDS clock channel. Moreover, the HDMI receiver 81 converts the differential signal into the corresponding image data, auxiliary data, and control data, and supplies these pieces of data to the sink signal processing portion 82 as may be necessary.

The sink signal processing portion 82 executes the necessary processing for the data supplied thereto from the HDMI receiver 81. In addition, the sink signal processing portion 82 exchanges information for control, or information notifying a status (Control/Status), or the like with the HDMI transmitter 81 as may be necessary.

The transmission channels of HDMI include the three TMDS channels #0, #1, #2 in which the image data, the auxiliary data, and the control data are transmitted from the HDMI transmission portion 202a to the HDMI reception portion 102 in a unidirectional direction synchronously with the picture clock, and a TMDS clock channel as a transmission channel in which the pixel clock is transmitted. In addition thereto, the transmission channels of HDMI include a Display Data Channel (DDC) 83 and a transmission channel called a CEC line 84.

The DDC 83 includes two lines (signal lines) (not depicted) included in the HDMI cable 610. The DDC 83 is used in order for the source apparatus to read out Enhanced-Extended Display Identification (E-EDID) from the sink apparatus connected through the HDMI cable 610. That is to say, the sink apparatus has an EDIDROM 85. The source apparatus reads out E-EDID, which the EDIDROM 85 stores therein, from the sink apparatus connected thereto through the HDMI cable 610 via the DDC 83, and recognizes the setting and performance of the sink apparatus based on the E-EDTD concerned.

The CEC line 84 includes one line (not depicted) included in the HDMI cable 610, and is used for carrying out the bidirectional communication of the data for control between the source apparatus and the sink apparatus.

In addition, the HDMI cable 610 includes a line 86 connected to a pin called a Hot Plug Detect (HPD). The source apparatus can detect the connection of the sink apparatus by utilizing the line 86 concerned. In addition, the HDMI cable 610 includes a line 87 used for supplying the power source from the source apparatus to the sink apparatus. Moreover, the HDMI cable 610 includes a reserve line 88.

Figure 8:
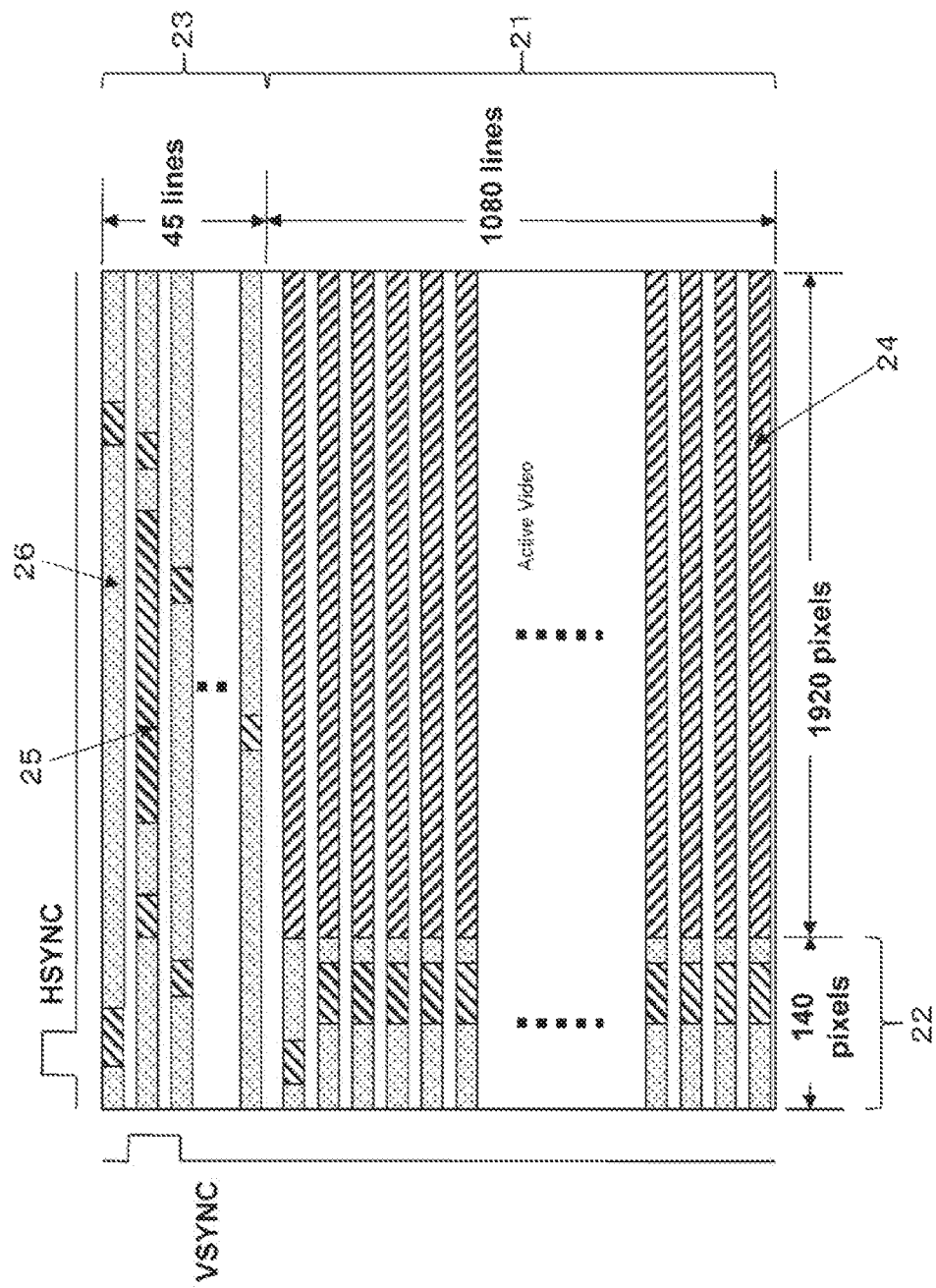
FIG. 8 is a diagram depicting a period of various kinds of transmission data in the case where image data of 1,920 pixels×1,080 lines in length×width in a TMDS channel is transmitted.

FIG. 8 depicts the periods of the various kinds of transmission data in the case where the image data of 1,920 pixels×1,080 lines in length×width in the TMDS channels is transmitted. Three kinds of periods: a Video Data Period 24; a Data Island Period 25; and a Control Period 26 are present depending on the kinds of transmission data in a Video Field in which the transmission data is transmitted in the three TMDS channels of HDMI.

Here, the video field period is a period from a rising edge (Active Edge) of a certain vertical synchronous signal to a rising edge of a next vertical synchronous signal. The video field period is divided into a Horizontal Blanking time period 22, a Vertical Blanking time period 23, and an Active Video period 21 as a period in which the horizontal blanking time period and the vertical blanking time period are excluded from the video field period.

The video data period 24 is allocated to the active video period 21. In the video data period 24, the data on the Active Pixels for 1,920 pixels×1,080 lines constituting the non-compression image data for one picture is transmitted. The data island period 25 and the control period 26 are allocated to the horizontal blanking time period 22 and the vertical blanking time period 23, respectively. In the data island period 25 and the control period 26, the Auxiliary Data is transmitted.

That is to say, the data island period 25 is allocated to a part of the horizontal blanking time period 22 and the vertical blanking time period 23. In the data island period 25, of the auxiliary data, the packet or the like of the data not relating to the control, for example, the audio data of the auxiliary data is transmitted. The control period 26 is allocated to other parts of the horizontal blanking time period 22 and the vertical blanking time period 23. In the control period 26, the data relating to the control of the auxiliary data, for example, the vertical synchronous signal and the horizontal synchronous signal, the control packet and the like are transmitted.

FIG. 9 depicts a pin arrangement of the HDMI connector. This pin arrangement is an example, of a type-A. Two lines as differential lines through which TMDS Data #i+ and TMDS Data #i− as differential signals of a TMDS channel #i are transmitted are connected to pins (pins having pin numbers 1, 4, and 7) to which TMDS Data #i+ is allocated, and pins (pins having pin numbers 3, 6, and 9) to which TMDS Data #i− is allocated.

In addition, a CEC line 84 through which the CEC signal as the data for control is transmitted is connected to a pin having a pin number 13, and a pin having a pin number 14 is a Reserved pin. In addition, a line through which a Serial Data (SDA) signal such as E-EDCD is transmitted is connected to a pin having a pin number 16, and a line through which a Serial Clock (SCL) signal as a clock signal used in the synchronization at the time of transmission/reception of the SDA signal is transmitted is connected to a pin having a pin number 15. The DDC 83 described above is constituted by the line through which the SDA signal is transmitted, and the line through which the SCL signal is transmitted.

In addition, the HPD line 86 for detection of connection of the sink apparatus by the source apparatus as described above is connected to a pin having a pin number 19. In addition, the power source line 87 for supply of the power source as described above is connected to a pin having a pin number 18.

[Example of Configuration of High-Speed Bus Interface]

Figure 10:
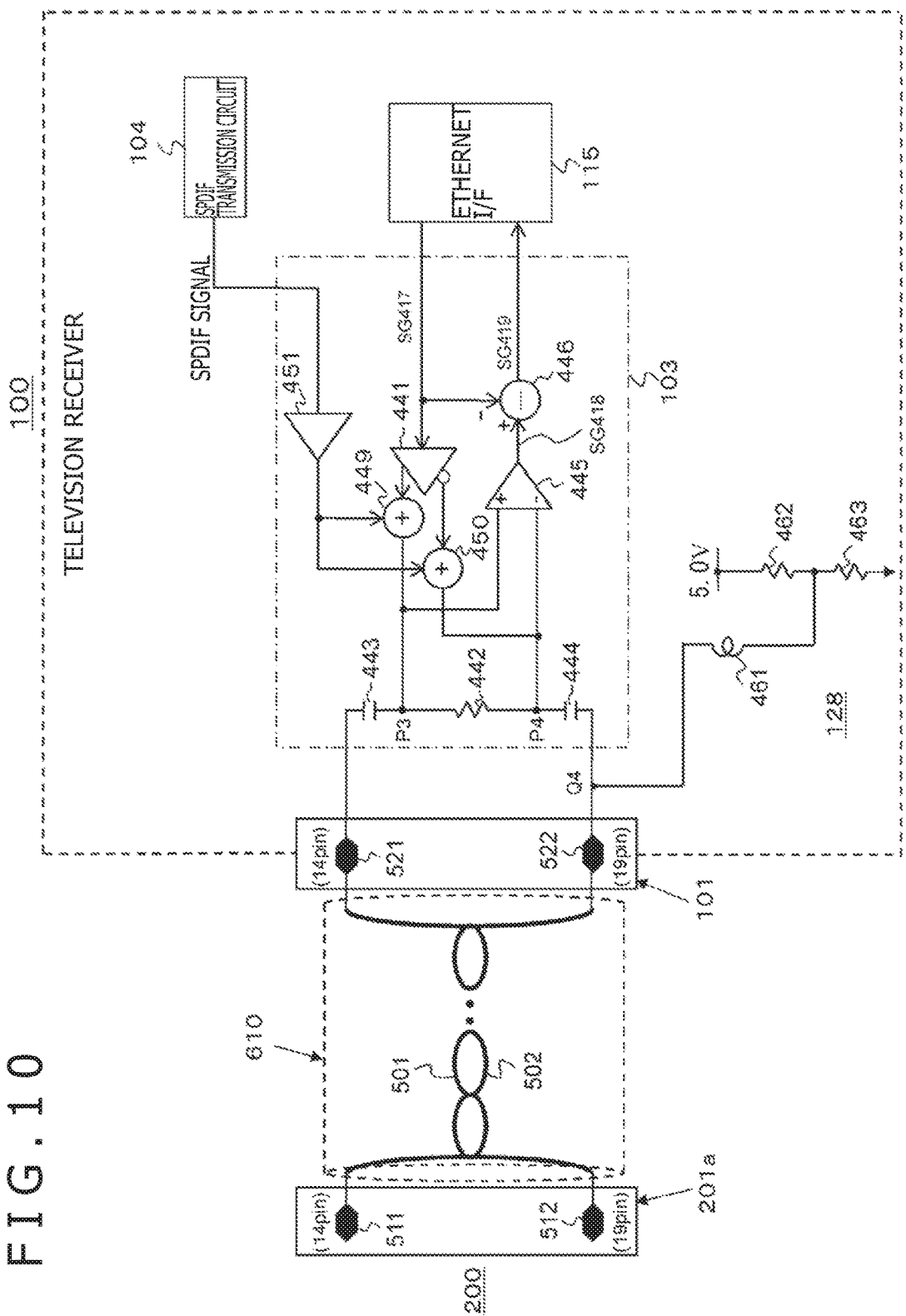
FIG. 10 is a block diagram depicting an example of a configuration of a high-speed bus interface of the television receiver.

FIG. 10 depicts an example of a configuration of the high-speed bus interface 103 of the television receiver 100 in the AV system 10 of FIG. 1. The Ethernet interface 115 carries out a Local Area Network (LAN) communication using a transmission path constituted by a pair of lines: the reserve line; and the HPD line of a plurality of lines constituting the HDMI cable 610, in a word, the transmission/reception of the Ethernet signal. The SPDIF transmission circuit 104 transmits the SPDIF signal by using the transmission path constituted by the pair of lines described above.

The television receiver 100 has a LAN signal transmitting circuit 441, a termination resistor 442, AC coupling capacitors 443 and 444, a LAN signal receiving circuit 445, a subtraction circuit 446, addition circuits 449 and 450, and an amplifier 451. Those constitute the high-speed bus interface 103. In addition, the television receiver 100 has a choke coil 461, a resistor 462, and a resistor 463 which constitute a plug connection transfer circuit 128.

A series circuit of the AC coupling capacitor 443, the termination resistor 442, and the AC coupling capacitor 444 is connected between a 14-pin terminal 521 and a 19-pin terminal 522 of the HDMI terminal 101. In addition, a series circuit of a resistor 462 and a resistor 463 is connected between a power source line (+5.0 V) and a grounding line. Then, a mutual connection point of the resistor 462 and the resistor 463 is connected to a connection point Q4 of the 19-pin terminal 522 and the AC coupling capacitor 444 through the choke coil 461.

A mutual connection point P3 of the AC coupling capacitor 443 and the termination resistor 442 is connected to an output side of the addition circuit 449, and is also connected to a positive input side of the LAN signal receiving circuit 445. In addition, a mutual connection point P4 of the AC coupling capacitor 444 and the termination resistor 442 is connected to an output side of the addition circuit 450, and is also connected to a negative input side of the LAN signal receiving circuit 445.

One terminal of the addition circuit 449 is connected to a positive output side of the LAN signal transmitting circuit 441. The SPDIF signal outputted from the SPDIF transmission circuit 104 is supplied to the other input side of the addition circuit 449 through the amplifier 451. In addition, one input side of the addition circuit 450 is connected to a negative output side of the LAN signal transmitting circuit 441. The SPDIF signal outputted from the SPDIF transmission circuit 104 is supplied to the other input side of the addition circuit 450 through the amplifier 451.

The transmission signal (transmission data) SG417 is supplied from the Ethernet interface 115 to the input side of the LAN signal transmitting circuit 441. In addition, an output signal SG418 from the LAN signal receiving circuit 445 is supplied to the positive side terminal of the subtraction circuit 446. A transmission signal SG417 is supplied to the negative side terminal of the subtraction circuit 446. The subtraction circuit 446 subtracts the transmission signal SG417 from an output signal SG418 from the LAN signal receiving circuit 445, thereby obtaining a reception signal (reception data) SG419. In the case where the LAN signal (Ethernet signal) is transmitted as the differential signal through the reserve line and the HPD line, the reception signal SG419 becomes the LAN signal concerned. The reception signal SG419 is supplied to the Ethernet interface 115.

Figure 11:
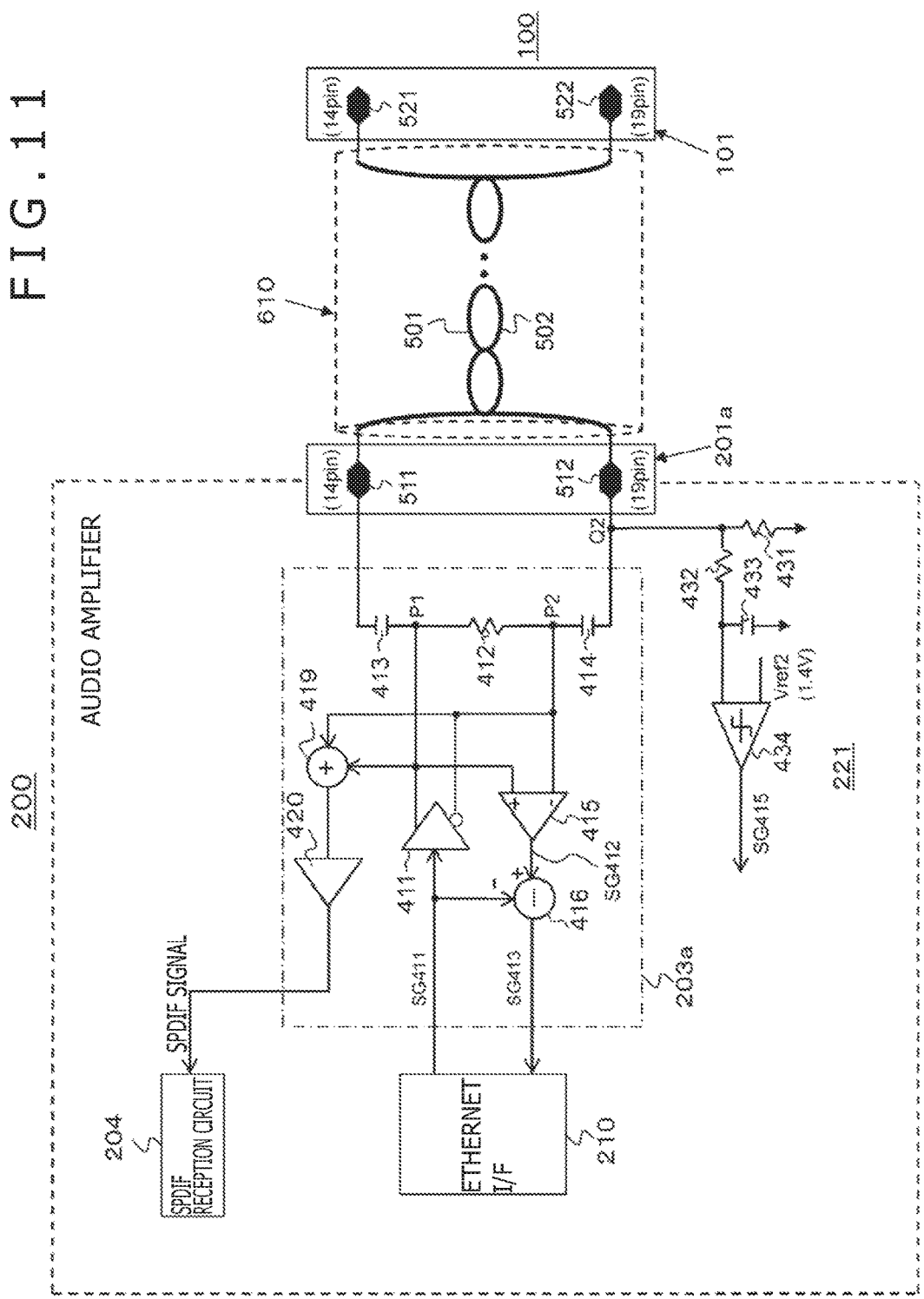
FIG. 11 is a block diagram depicting an example of a configuration of a high-speed bus interface of the audio amplifier.

FIG. 11 depicts an example of a configuration of the high-speed bus interface 203a of the audio amplifier 200 in the AV system 10 of FIG. 1. The Ethernet interface 210 carries out a Local Area Network (LAN) communication using a transmission path constituted by a pair of lines: the reserve line; and the HPD line of a plurality of lines constituting the HDMI cable 610, in a word, the transmission/reception of the Ethernet signal. The SPDIF reception circuit 204 receives the SPDIF signal by using the transmission path constituted by the pair of lines described above.

The audio amplifier 200 has a LAN signal transmitting circuit 411, a termination resistor 412, AC coupling capacitors 413 and 414, a LAN signal receiving circuit 415, a subtraction circuit 416, an addition circuit 419, and an amplifier 420. These constituent elements constitute the high-speed bus interface 203a. In addition, the audio amplifier 200 has a pull-down resistor 431, a resistor 432, a capacitor 433, and a comparator 434 which constitute the plug connection detecting circuit 221. Here, the resistor 432 and the capacitor 433 constitute a low-pass filter.

A series circuit of the AC coupling capacitor 413, the termination resistor 412 and the AC coupling capacitor 414 is connected between a 14-pin terminal 511 and a 19-pin terminal 512 of the HDMI terminal 201a. A mutual connection point P1 of the AC coupling capacitor 413 and the termination resistor 412 is connected to a positive output side of the LAN signal transmitting circuit 411, and is also connected to a positive input side of the LAN signal receiving circuit 415.

A mutual connection point P2 of the AC coupling capacitor 414 and the termination resistor 412 is connected to a negative output side of the LAN signal transmitting circuit 411. The mutual connection point P2 is also connected to a negative input side of the LAN signal receiving circuit 415. A transmission signal (transmission data) SG411 is supplied from the Ethernet interface 210 to an input side of the LAN signal transmitting circuit 411.

An output signal SG412 from the LAN signal receiving circuit 415 is supplied to the positive side terminal of the subtraction circuit 416. A transmission signal (transmission data) SG411 is supplied to the negative side terminal of the subtraction circuit 416. The subtraction circuit 416 subtracts the transmission signal SG411 from an output signal SG412 from the LAN signal receiving circuit 415, thereby obtaining a reception signal SG413. When the LAN signal (Ethernet signal) is transmitted as the differential signal through the reserve line and the HPD line, the reception signal SG413 becomes the LAN signal concerned. The reception signal SG413 is supplied to the Ethernet interface 210.

A connection point Q2 of the AC coupling capacitor 414 and the 19-pin terminal 512 is connected to a grounding line through the pull-down resistor 431. The connection point Q3 is also connected to the grounding line through the series circuit of the resistor 432 and the capacitor 433. Then, an output signal from the low-pass filter obtained in a mutual connection point of the resistor 432 and the capacitor 433 is supplied to one input terminal of the comparator 434. The comparator 434 compares the output signal from the low-pass filter with a reference voltage $V_{ref2}$ (+1.4 V) supplied to the other input terminal of the comparator 434. An output signal SG415 from the comparator 434 is supplied to a control portion (CPU) (not depicted) of the audio amplifier 200.

In addition, a mutual connection point P1 of the AC coupling capacitor 413 and the termination resistor 412 is connected to one input terminal of the addition circuit 419. In addition, a mutual connection point P2 of the AC coupling capacitor 414 and the termination resistor 412 is connected to the other input terminal of the addition circuit 419. An output signal from the addition circuit 419 is supplied to the SPDIF reception circuit 115 through the amplifier 420. When the SPDIF signal is transmitted as an in-phase signal through the reserve line and the HPD line, the output signal from the addition circuit 419 becomes the SPDIF signal concerned.

It should be noted that although the detailed description is omitted here, the high-speed bus interface 203b of the audio amplifier 200 has the similar configuration to that in which a portion(s) pertaining to the SPDIF signal is(are) removed from the high-speed bus interface 103 depicted in FIG. 10. In addition, although the detailed description is omitted here, the high-speed bus interface 303 of the BD player 300 has the similar configuration to that in which a portion(s) pertaining to the SPDIF signal is(are) removed from the high-speed bus interface 203a depicted in FIG. 11.

[Details of SPDIF Signal]

Firstly, an outline of the IEC 60958 standards will be now described. FIG. 12 depicts a frame structure in the IEC 60958 standards. Each of the frames is structured by two sub-frames. In the case of 2 channel stereo audio, a left channel signal is contained in the first sub-frame, and a right channel signal is contained in the second sub-frame.

As will be described later, a preamble is provided in the head of the sub-frame. "M" is given as the preamble to a left channel signal, and "W" is given as the preamble to a right channel signal. However, "B" representing the start of a block is given to the head preamble every 192 frames. That is to say, one block is structured by 192 frames. The block is a unit constituting a channel status which will be described later.

Figure 13:
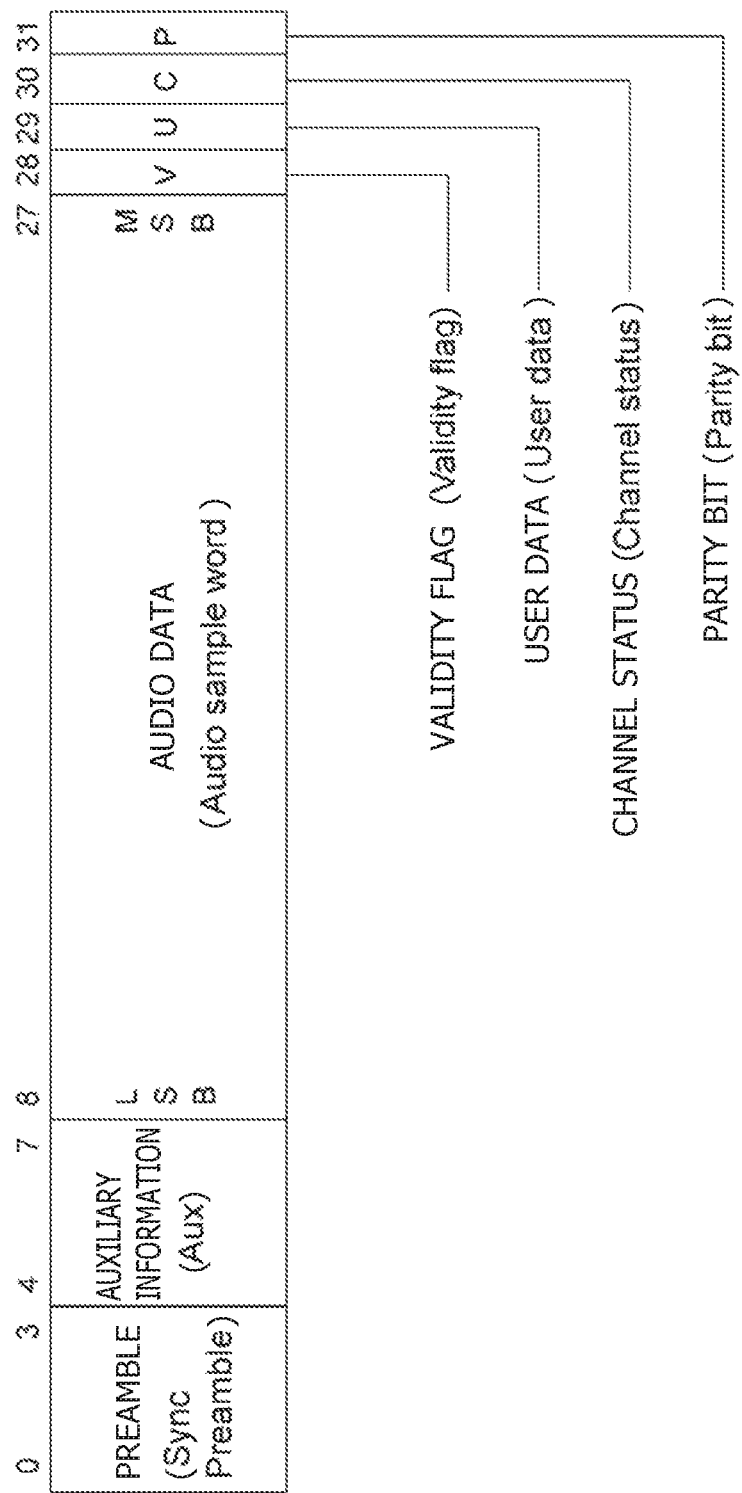
FIG. 13 is a diagram depicting a sub-frame structure in the IEC 60958 standards.

FIG. 13 depicts a sub-frame structure in the IEC 60958 standards. The sub-frame is constituted by 0-th to 31-th time slots, that is, 32 time slots in total. The 0-th to third time slots exhibit a preamble (Sync preamble). The preamble exhibits any of "M," "W" or "B" in order to represent a distinction of left and right channels, and a start position of the block in the manner as described above.

The fourth to 27-th time slots are a main data field, and the whole exhibits the audio data when 24-bit code range is adopted. In addition, when 20 bit code range is adopted, the eighth to 27-th time slots exhibit audio data (Audio sample word). In the case of the latter, the fourth to seventh time slots can be utilized as auxiliary information (Auxiliary sample bits). An example of FIG. 3 represents the latter.

The 28-th time slot is a Validity flag of the main data field. The 29-th time slot exhibits the data for one bit of User data. The 29-th time slot is accumulated so as to straddle the respective frames, thereby enabling a series of user data to be structured. A message of the user data is structured with an Information Unit (IU) of 8 bits as a unit, and 3 to 129 information units are contained in one message.

"0" of 0 to 8 bits can be present between the information units. The head of the information unit is identified by a start bit of "1." The first 7 information units within the message are reversed. The user can set arbitrary information in the information units in and after the eighth information unit. The messages can be divided by "0" of 8 bits or more.

The 30-th time slot exhibits the data for 1 bit of a Channel status. The 30-th time slot is accumulated so as to straddle the respective frames every block, thereby enabling a series of channel statuses to be structured. Incidentally, the head position of the block is exhibited by the preamble of "B" (0-th to third time slots).

The 31-th time slot is a Parity bit. The parity bit is given in such a way that the number of "0" and "1" contained in the fourth to 31-th time slots becomes an even number.

FIG. 14 depicts a signal modulation system in the IEC 60958 standards. The fourth to 31-th time slots except for the preambles of the sub-frames are subjected to a bi-phase mark modulation. During the bi-phase mark modulation, a clock which is double in speed the original signal (source coding) is used. When a clock cycle of the original signal is divided into a first half and a second half, an output of the bi-phase mark modulation is necessarily inverted at the edge of the clock cycle of the first half. In addition, the output of the bi-phase mark modulation is inverted when the original signal exhibits "1" at the edge of the clock cycle of the second half, and is not inverted when the original signal exhibits "0." As a result, the clock component in the original signal can be extracted from the signal obtained through the bi-phase mark modulation.

FIG. 15 depicts channel coding of the preamble in the IEC 60958 standards. As described above, of the sub-frames, the fourth to 31-th time slots are subjected to the bi-phase mark modulation. On the other hand, the preambles of the 0-th to third time slots are not subjected to the bi-phase mark modulation, but are treated as a bit pattern which is synchronized with a double speed clock. That is to say, two bits are allocated to each of the time slots of the 0-th to third time slots, thereby obtaining a 8-bit pattern as depicted in the figure.

If a just previous state is "0," then, "11101000," "11100010," and "1100100" are allocated to "B," "M," and "W," respectively. On the other hand, if the just previous state is "1," then, "00010111," "00011101," and "00011011" are allocated to "B," "M," and "W," respectively.

Figures 16A, 16B, 16C:
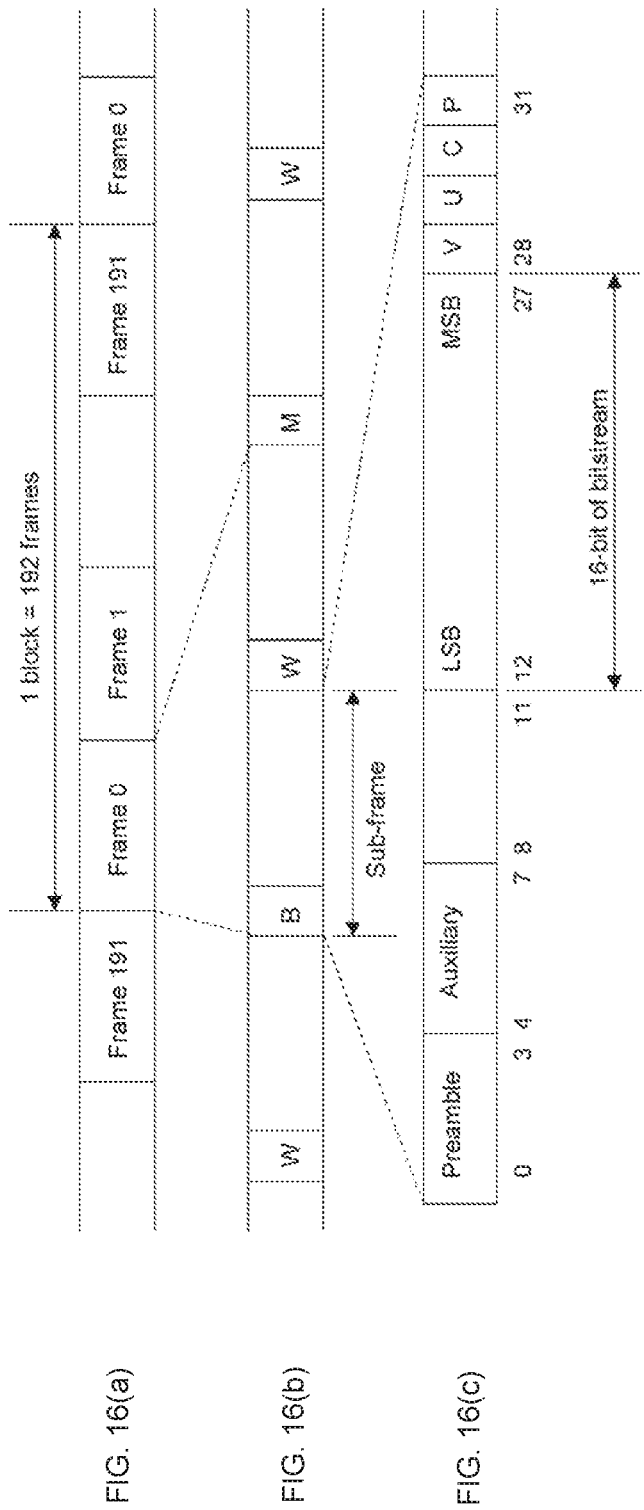
FIGS. 16(a), 16(b), and 16(c) are diagrams depicting an IEC 60958 interface format.

FIGS. 16(a), 16(b), and 16(c) depicts an IEC 60958 interface format. FIG. 16(a) depicts a frame structure. One block is structured by 192 frames, and a structure in which such blocks are continuous is adopted. FIG. 16(b) depicts that each of the frames is constituted by two sub-frames.

The preamble is provided in the head of the sub-frame, and "B" exhibiting the start of the block is given to the preamble of the head of the sub-frame of the block. Then, "W" and "M" are alternately given to the preambles of the heads of the following respective sub-frames.

FIG. 16(c) depicts a sub-frame structure. In the case of the SPDIF signal containing the compression digital audio signal as the digital audio signal SA, a bit stream of the compression digital audio signal is divided to be successively inserted into the 12-th to 27-th time slots of the respective sub-frames.

[Details of Transmission of Digital Audio Signal]

As described above, the television receiver 100 transmits the SPDIF signal (the digital audio transmission signal complying with the IEC 60958 standards) containing the digital audio signal SA from the SPDIF transmission circuit 104 to the audio amplifier 200. At this time, the SPDIF transmission circuit 104 adds the information (metadata) relating to the digital audio signal SA to be next transmitted to the digital audio signal SA which is currently being transmitted.

Figure 17:
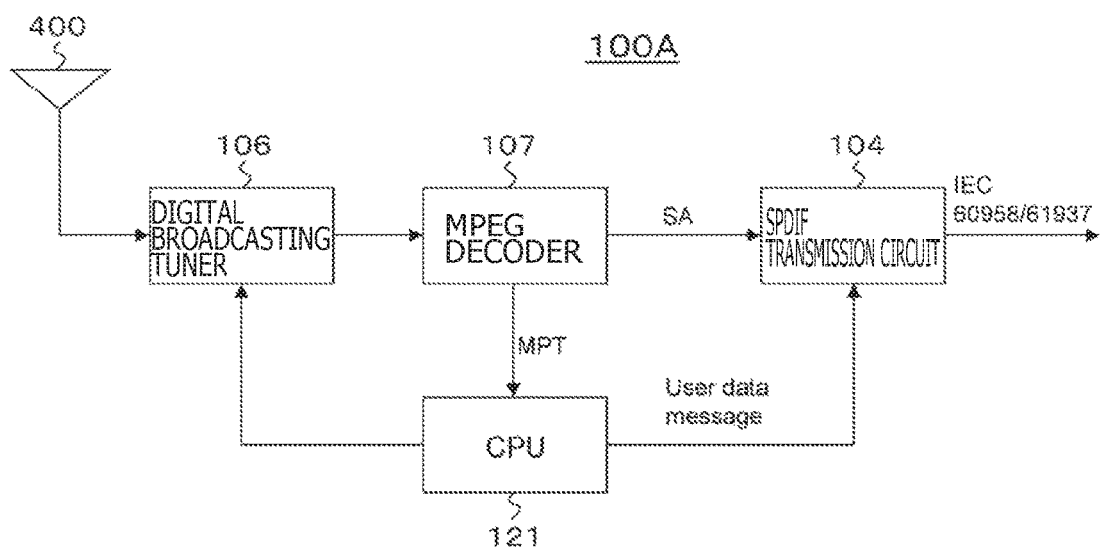
FIG. 17 is a block diagram schematically depicting a transmission system for a digital audio signal in the television receiver.

FIG. 17 schematically depicts a transmission system 100A for the digital audio signal SA in the television receiver 100. In FIG. 17, the portions corresponding to those in FIG. 2 are added with the same reference numerals to be depicted. The digital audio signal SA of 2 channel, 5.1 channel and the like which is obtained from the MPEG decoder 107 is supplied to the SPDIF transmission circuit (transmission LSI) 104. In the SPDIF transmission circuit 104, the SPDIF signal containing the digital audio signal SA is produced and is transmitted.

Here, the digital audio signal SA supplied to the SPDIF transmission circuit 104 is the LPCM signal or the compression digital audio signal. MPEG-4 AAC, MPEG-4 ALS, and the like, for example, are supposed as the compression digital audio signal. The SPDIF transmission circuit 104 adds the information (metadata), such as the audio format, relating to the digital audio signal SA to be next transmitted to the digital audio signal SA which is currently being transmitted.

In this case, the user data message containing that information is supplied from the CPU 121 to the SPDIF transmission circuit 104. The CPU 121 needs to know the audio format of the digital audio signal SA to be next transmitted in advance. The CPU 121, for example, can carry out this by acquiring an MMT Package Table (MPT) in the MPEG stream to be sent.

The user data message is regulated within a User data bit regulated in IEC 60958-1. For the user data bit, a consumer use method is regulated in IEC 60958-3, and the regulations of the user data message such as "SMPTE time code," "Latency," and "Loudness" are present.

The user data bits are information units (IU) in minimum unit, and are 8-bit length in total having a start bit having logic "1," and seven pieces of data each having one bit referred to as Q, R, S, T, U, V, and W. A plurality of information units is collected to structure the user data message(s).

The kind of the user data message is regulated by three bits of "RST" of the first information unit. For example, the kind of the user data message can be regulated in such a way that "110" exhibits "SMPTE time code," "110" exhibits "Latency," and "111" exhibits "loudness." For example, the kind of the user data message is regulated in such a way that "101" exhibits a user data message of this time.

FIG. 18 depicts an example of a structure (Syntax) of the user data message of this time. It should be noted that in the illustration, only a user information portion is depicted. The user information portion is constituted by four information units (IU). Information of "IEC 60958 Frame Rate" is arranged in bits from fifth bit to the 0-th bit of the first IU. This information exhibits an LPCM/compression digital audio transmission frequency.

The LPCM/compression digital audio transmission frequency is a fundamental frequency with which the PLL is locked when an IEC 60958-3 digital audio signal (SPDIF signal) is received. The frequency to which the PLL is actually locked is 128 times as large as the LPCM/compression digital audio transmission frequency because the metadata is added thereto and the modulation is carried out therefor. In a word, when a transmission frequency exhibited by "IEC 60958 Frame Rate" is 48 kHz, the PLL is actually locked at 6.144 MHz. This is regulated in IEC 60958-1.

In addition, information of "Original sampling frequency" is arranged in the bits from the fifth bit to the second bit of the second IU. This information exhibits a sampling frequency which is used when the signal is converted into an analog signal. In addition, information of "Audio sampling frequency coefficient" is arranged in the bits from the first bit to the 0-th bit of the second IU, and in the bits from the fifth bit to the fourth bit of the third IU. This information exhibits a ratio of the transmission frequency to the sampling frequency. In addition, information of "Data Type" is arranged in the bits from the third bit to the 0-th bit of the third IU, and in the bits from the fifth bit to the third bit of the fourth IU. This information exhibits a type of the LPCM or the compression codec.

In the next-generation television broadcasting, it is planned that MPEG-4 AAC of 5.1 channel is broadcasted at most 1.4 Mbps at the sampling frequency of 48 kHz. This is outputted at IEC 60958 Frame Rate=48 kHz. When the digital audio signal SA to be next transmitted is MPEG-4 AAC concerned, the respective pieces of information within the user data message are described as follows.

"IEC 60958 Frame Rate": 48 kHz
"Original sampling frequency": 48 kHz
"Audio sampling frequency coefficient": ×1
"Data type": MPEG-4 AAC In addition, in the next-generation television broadcasting, MPEG-4 ALS is newly adopted. In this case, MPEG-4 ALS of 5.1 channel is outputted at IEC 60958 Frame Rate=96 kHz at the sampling frequency of 48 kHz. When the digital audio signal SA to be next transmitted is MPEG-4 ALS concerned, the respective pieces of information within the user data message are described as follows.

"IEC 60958 Frame Rate": 96 kHz
"Original sampling frequency": 48 kHz
"Audio sampling frequency coefficient": ×2
"Data type": MPEG-4 ALS In addition, as described above, the audio amplifier 200 receives the SPDIF signal (the digital audio transmission signal complying with the IEC 60958 standards) which is transmitted thereto from the television receiver 100 at the SPDIF reception circuit 204. Thus, the SPDIF reception circuit 204 acquires the digital audio signal SA contained in the SPDIF signal. The MPEG decoder 205 executes the decoding processing for the digital audio signal SA contained in the SPDIF signal, thereby obtaining the non-compression digital audio signal of 2 channel, 5.1 channel or the like. In this case, the MPEG decoder 205 processes the digital audio signal SA to be next received based on the information (metadata), relating to the digital audio signal SA to be next received, which is added to the digital audio signal SA which is currently being received.

Figure 19:
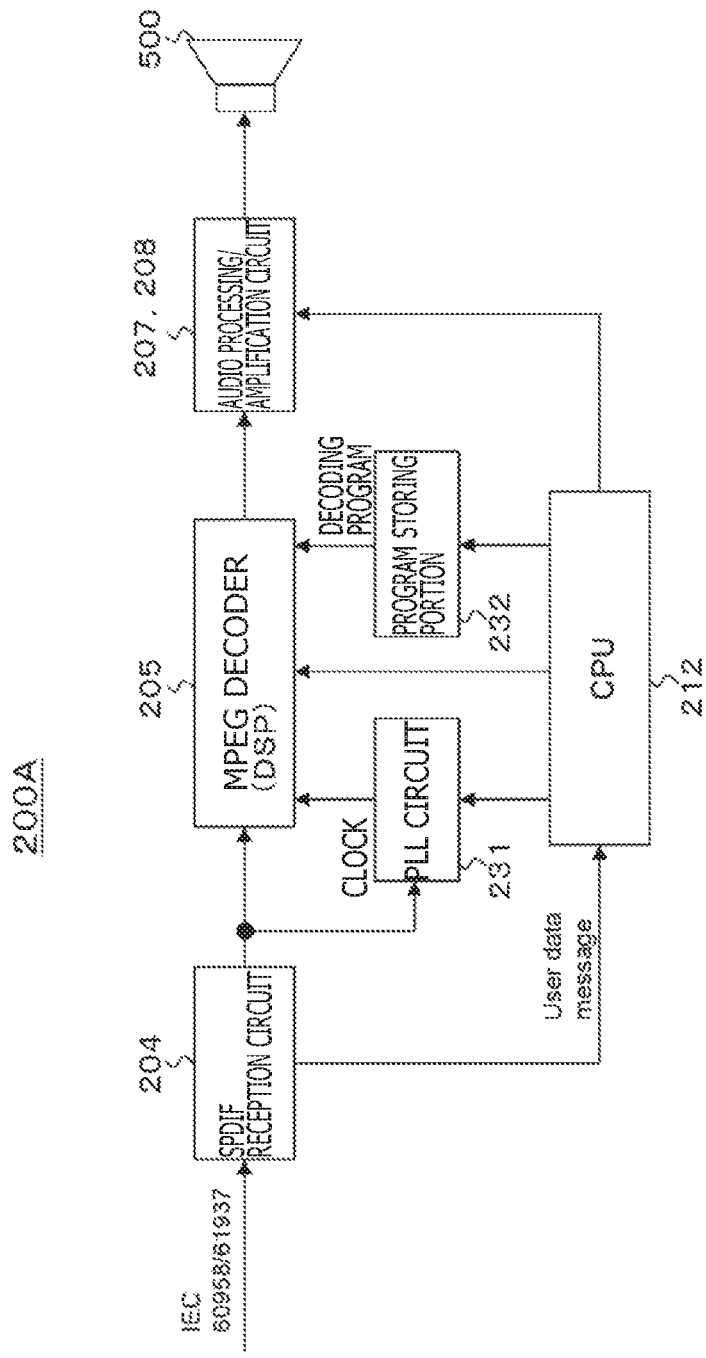
FIG. 19 is a block diagram schematically depicting a transmission system for a digital audio signal in an audio amplifier.

FIG. 19 schematically depicts a reception system 200A for the digital audio signal SA in the audio amplifier 200. In FIG. 19, the portions corresponding to those in FIG. 3 are added with the same reference numerals to be depicted. The digital audio signal SA obtained in the SPDIF reception circuit 204 is supplied to the MPEG decoder 205. The MPEG decoder 205 executes the decoding processing for the digital audio signal SA, thereby obtaining the non-compression digital audio signal of 2 channel, 5.1 channel or the like. After the resulting non-compression digital audio signal is converted into an analog signal in the audio processing circuit 207/the audio amplifying circuit 208, and is then amplified, the resulting analog signal is supplied to the speaker system 500.

Information (metadata) relating to the digital audio signal SA which is to be next received is added to the digital audio signal SA which is currently being received in the SPDIF reception circuit 204. In the SPDIF reception circuit 204, the user data message containing this information is acquired and is then supplied to the CPU 212.

The processing in the MPEG decoder 205 is executed by using a clock signal, synchronously with the digital audio signal SA, which is obtained in a Phase Locked Loop (PLL)

circuit 231. In addition, the MPEG decoder 205 is constituted by a digital signal processing (DSP). A program (decoding program) corresponding to the data type of the digital audio signal SA is loaded from a program storage portion 232 to be used.

When the received digital audio signal SA is switched from current one to next one, before reception of the next digital audio signal SA, as described above, the preparation (advance preparation) for the decoding processing in the MPEG decoder 205 is carried out based on the information contained in the user data message extracted in the SPDIF reception circuit 204. Upon start of the reception of the next digital audio signal SA, the decoding processing corresponding thereto is executed.

As described above, the processing in the MPEG decoder 205 is executed by using the clock signal synchronized with the digital audio signal SA. For this reason, in the preparation, the central frequency of the PLL 231 is set to a frequency which is 128 times as large as the transmission frequency exhibited by "IEC 60958 Frame Rate." In addition, in the preparation, the program of the data type exhibited by "Data Type" is loaded from the program storage portion 232 into the MPEG decoder 205.

Here, in the case where the MPEG decoder 205 can execute the parallel processing, when the user data message is extracted in the SPDIF reception circuit 204, the preparation for the decoding processing for the digital audio signal SA to be next received is started based on the information contained in the user data message without waiting for the end of the audio signal SA which is currently being received. On the other hand, in the case where the MPEG decoder 205 cannot execute the parallel processing, after the user data message is extracted in the SPDIF reception circuit 204, the preparation for the decoding processing for the digital audio signal SA to be next received is started based on the information contained in the user data message from a time point of end of the digital audio signal SA which is currently being received. For example, when MPEG-4 AAC is switched over to MPEG-4 ALS, the central frequency of the reception PLL is changed in setting from 48 kHz to 96 kHz, and the decoding program in the MPEG decoder 205 is re-loaded from one for MPEG-4 AAC into one for MPEG-4 ALS.

In such a way, the preparation for the decoding processing in the MPEG decoder 205 is carried out based on the information contained in the user data message extracted in the SPDIF reception circuit 204 before reception of the digital audio signal SA. As a result, the decoding processing for the next digital audio signal SA is suitably executed from the head of the digital audio signal SA, and thus the head omission can be prevented.

Figure 20:
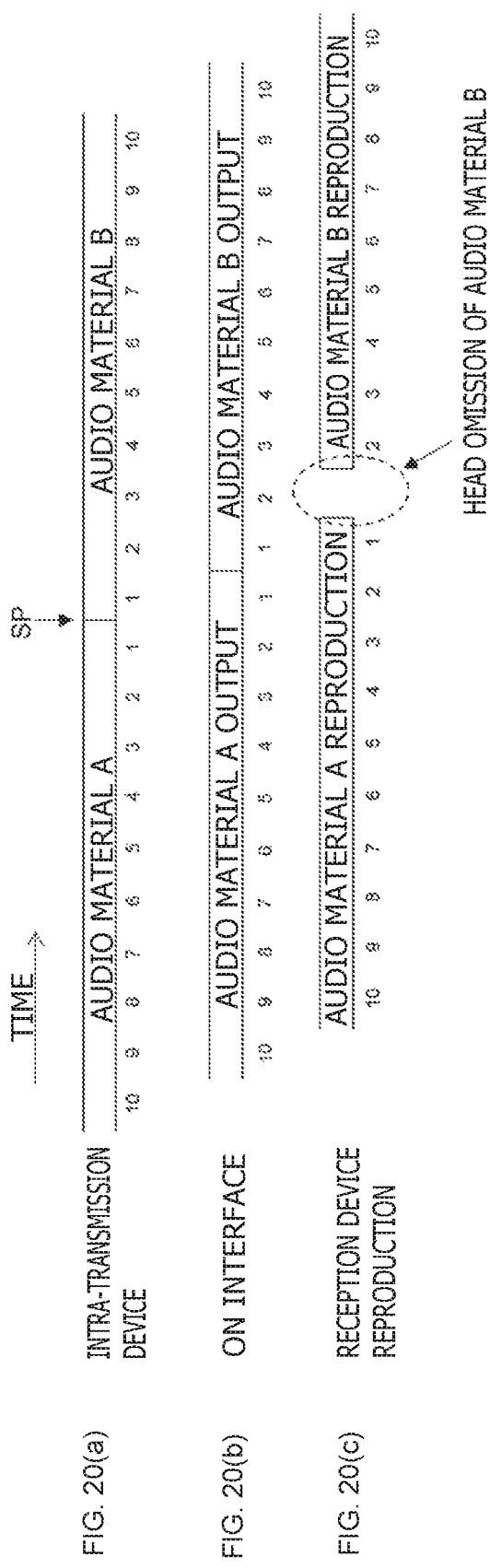
FIGS. 20(a), 20(b), and 20(c) are diagrams depicting an example in the case where no information is added to the digital audio signal.

FIGS. 20(a), 20(b), and 20(c) depicts an example in the case where no information is added to the digital audio signal SA. FIG. 20(a) depicts a state of the digital audio signal SA which is obtained from the broadcasting signal by the transmission device. An audio material A continues until a switching point SP, and an audio material B continues at and after this switching point SP. FIG. 20(b) depicts the digital audio signal SA which is transmitted from the transmission device to the audio amplifier. In this case, since the digital audio signal SA is outputted from the transmission device to the outside, there is some delay.

FIG. 20(c) depicts a reproduced output in the reception device. In this case, following the end of reception of the audio material, the reception of the audio material B is started. In this case, however, the preparation for the decoding processing for the audio material B is carried out from the time of this start, and the processing concerned is executed as soon as the preparation is completed. For this reason, the head omission is generated in the audio material B. In the example depicted in FIG. 20(c), a portion of "1" is omitted.

Figure 21:
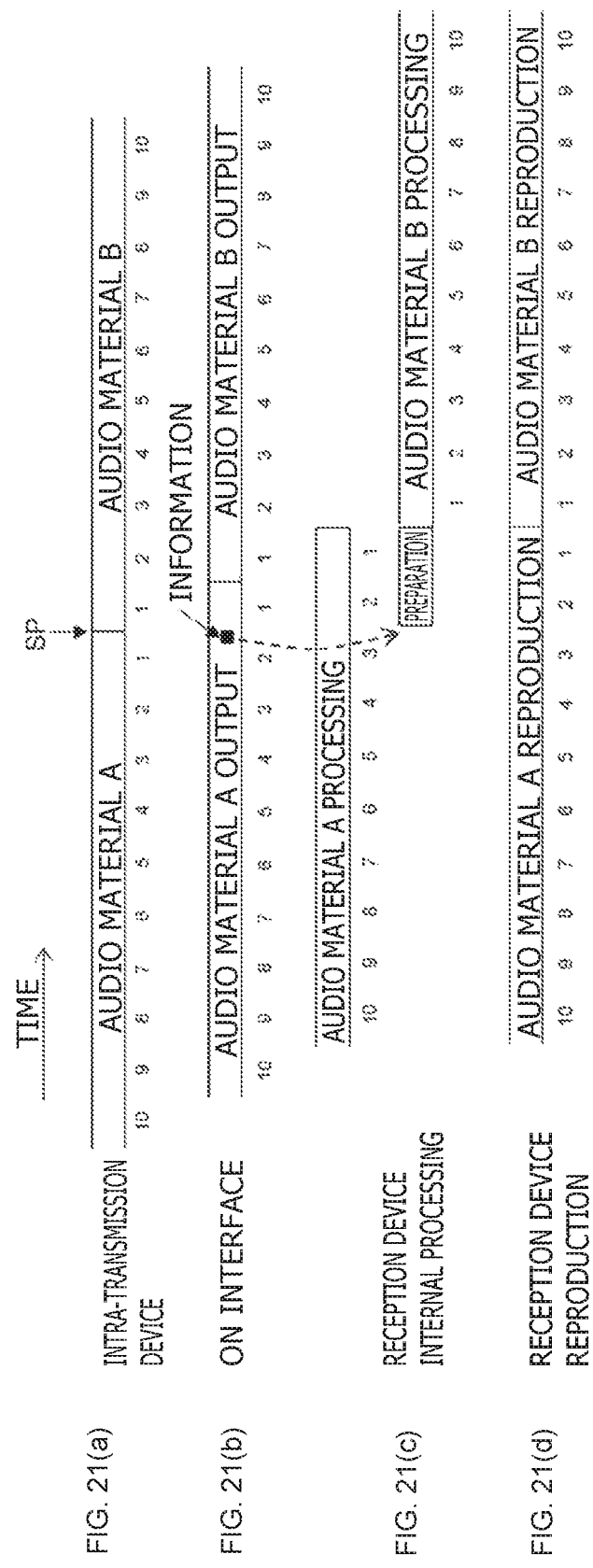
FIGS. 21(a), 21(b), 21(c), and 21(d) are diagrams depicting an example in the case where information is added to the digital audio signal, and an MPEG decoder of a reception device can execute parallel processing.

FIGS. 21(a), 21(b), 21(c), and 21(d) depicts an example when the information is added to the digital audio signal SA, that is, when the MPEG decoder 205 of the reception device 200 can execute the parallel processing. FIG. 21(a) depicts a state of the digital audio signal SA which is obtained from the broadcasting signal in the transmission device 100. The audio material A continues until a switching point SP, and an audio material B continues at and after this switching point SP.

FIG. 21(b) depicts the digital audio signal SA which is transmitted from the transmission device 100 to the audio amplifier 200. In this case, since the digital audio signal SA is outputted from the transmission device to the outside, there is some delay. In such a way, in the digital audio signal SA which is transmitted to the audio amplifier 200, the information relating to the audio material B is added to the position located a predetermined time period before the end of the audio material B.

FIG. 21(c) depicts internal processing in the reception device 200. The preparation for the decoding processing for the audio material B is carried out based on the information extracted from the audio material A without waiting for the end of the processing for receiving the audio material A. Then, upon the start of reception of the audio material B, the processing for the audio material B is executed immediately. FIG. 21(d) depicts reproduced output in the reception device. In this case, since the preparation for the decoding processing for the audio material B is carried out in advance, the head omission is prevented from occurring in the reproduced output of the audio material B.

Figure 22:
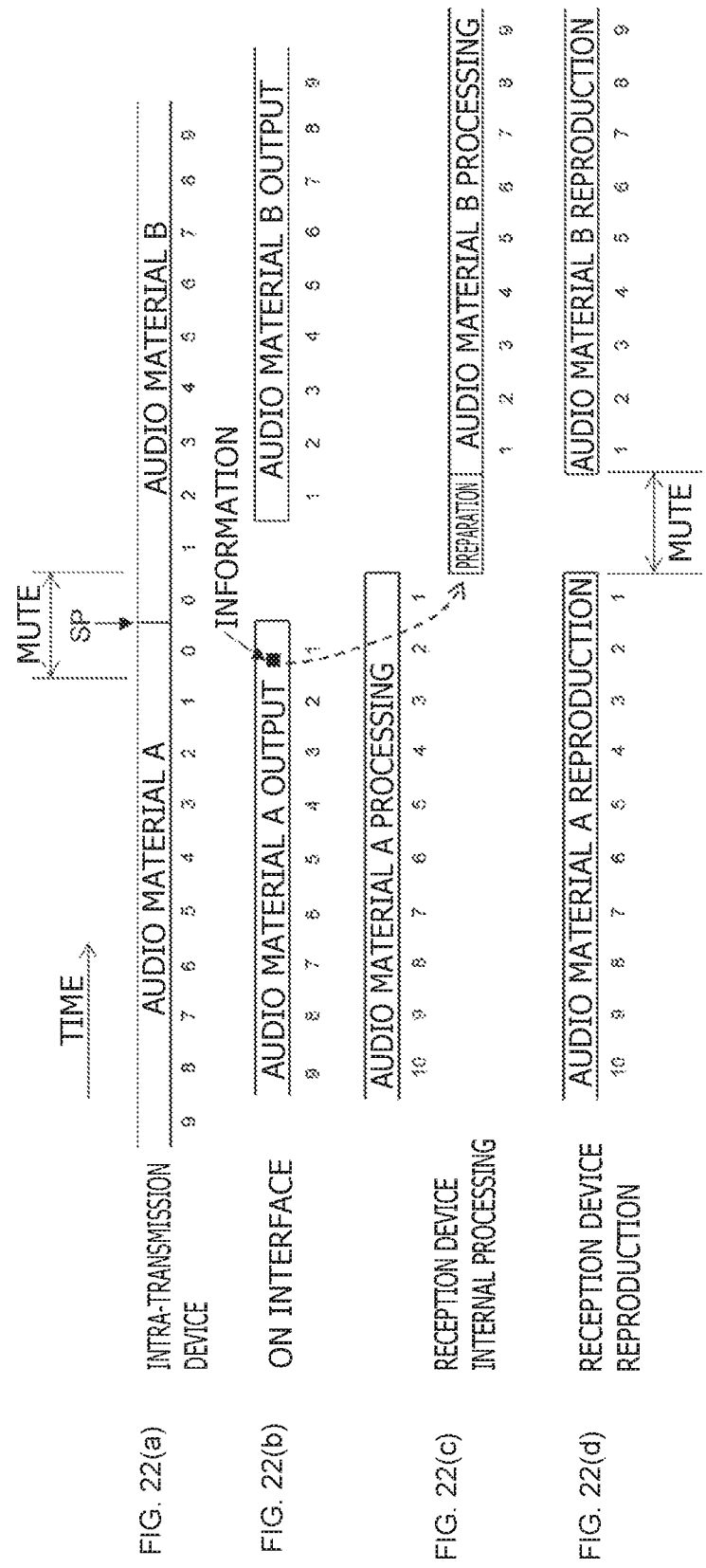
FIGS. 22(a), 22(b), 22(c), and 22(d) are diagrams depicting an example in the case where the information is added to the digital audio signal, and the MPEG decoder of a reception device cannot execute the parallel processing.

FIGS. 22(a), 22(b), 22(c), and 22(d) depicts an example when the information is added to the digital audio signal SA, that is, when the MPEG decoder 205 of the reception device 200 cannot execute the parallel processing. FIG. 22(a) depicts a state of the digital audio signal SA which is obtained from the broadcasting signal in the transmission device 100. The audio material A continues until a switching point SP, and an audio material B continues at and after this switching point SP. Note that, in this case, a predetermined time period prior to and after this switching point SP is made a mute portion. In the example of the illustration, a portion of "0" is the mute portion.

FIG. 22(b) depicts the digital audio signal SA which is transmitted from the transmission device 100 to the audio amplifier 200. In this case, since the digital audio signal SA is outputted from the transmission device to the outside, there is some delay. In such a way, in the digital audio signal SA which is transmitted to the audio amplifier 200, the information relating to the audio material B is added to the position located a predetermined time period before the end of the audio material A.

FIG. 22(c) depicts internal processing in the reception device 200. The preparation for the decoding processing for the audio material B is carried out based on the information extracted from the audio material A after waiting for the end of the reception of the reception processing for the audio material A. Then, upon the start of reception of the audio material B, the processing for the audio material B is executed. FIG. 22(d) depicts the reproduced output in the reception device. In this case, since the preparation for the decoding processing for the audio material B is carried out in advance, the head omission is prevented from occurring in the reproduced output of the audio material B. In this case, however, the mute portion is present between the audio material A and the audio material B.

Figure 23:
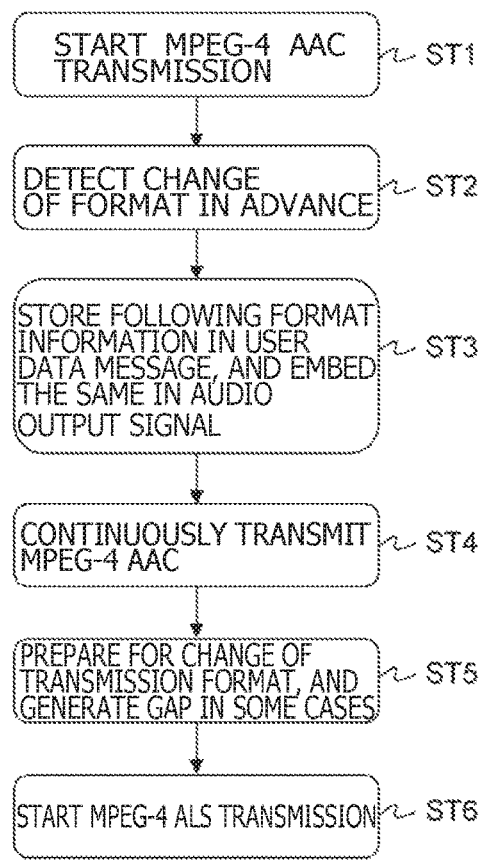
FIG. 23 is a flow chart depicting a control flow in the case where an audio material A of MPEG-4 AAC is switched to an audio material B of MPEG-4 ALS in order to carry out transmission.

FIG. 23 depicts a control flow when, for example, the audio material A of MPEG-4 AAC is switched to the audio material B of MPEG-4 ALS in order to carry out the transmission. Firstly, in Step ST1, the CPU 121 starts the transmission of the audio material A of MPEG-4 AAC. Next, in Step ST2, the CPU 121 detects a change in format, that is, the audio format of the audio material B of MPEG-4 ALS to be next transmitted in advance. In this case, the CPU 121, for example, detects the format change with MPT within MPEG in advance.

Next, in Step ST3, the CPU 121 stores the following format information in the user data message to be embedded in the audio output signal. Next, in Step ST4, the CPU 121 continuously transmits the audio material A of MPEG-4 AAC.

Next, in Step ST5, the CPU 121 prepares for the change of the transmission format. A gap is generated for a time period from the end of the audio material A of MPEG-4 AAC to the start of the audio material B of MPEG-4 ALS in some cases. Next, in Step ST6, the CPU 121 starts the transmission of the audio material B of MPEG-4 ALS.

As described above, in the AV system 10 depicted in FIG. 1, when the television receiver 100 transmits the digital audio signal SA to the audio amplifier 200, the television receiver 100 adds the information associated with the digital audio signal to be next transmitted to the digital audio signal SA which is currently transmitted. For this reason, a plurality of kinds of LPCM signals/compression digital audio signal can be switched to one another in transmission, thereby satisfactorily carrying out the audio reproduction.

<2. Modified Changes>

It should be noted that in the embodiment described above, there is illustrated the example in which the transmission side is the television receiver 100, and the digital audio signal SA which is to be transmitted to the audio amplifier 200 is acquired from the broadcasting signal. However, the present technique can be similarly applied to an example in which the transmission side is the medium reproducer, and the digital audio signal SA which is to be transmitted to the audio amplifier 200 can be read out from the medium to be obtained.

Figure 24:
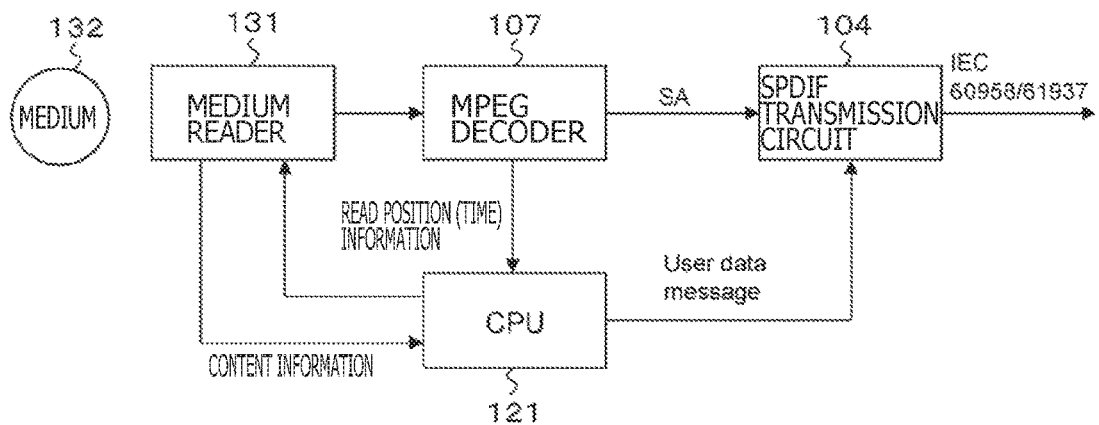
FIG. 24 is a block diagram schematically depicting a transmission system for a digital audio signal in a medium reproducer.

FIG. 24 schematically depicts a transmission system 300A for the digital audio signal SA in the medium reproducer. In FIG. 24, portions corresponding to those in FIG. 17 are assigned the same reference numerals, and the detailed description thereof is suitably omitted here. A medium reader 131, for example, reads out the digital audio signal SA from a disc medium 132 such as a BD-ROM, and sends the digital audio signal SA to the SPDIF transmission circuit 104 through the MPEG decoder 107.

Read position (time) information is sent from the MPEG decoder 107 to the CPU 121. The CPU 121 acquires the content information written to the medium 132 by controlling the medium reader 131 based on the read position (time) information. The CPU 121 can know the audio format of the digital audio signal SA to be next transmitted in advance by such advance reading. The user data message containing the information (metadata) on the digital audio signal SA which is to be next transmitted is supplied from the CPU 121 to the SPDIF transmission circuit 104.

Incidentally, in the embodiment described above, there is illustrated the example in which the four pieces of information: "IEC 60958 Frame Rate"; "Original sampling frequency"; "Audio sampling frequency coefficient"; and "Data Type" are contained in the user data message (refer to FIG. 18).

However, another information, for example, the information exhibiting a mode of the encryption when the digital audio signal SA is encrypted and is transmitted, the information exhibiting a start timing of the digital audio signal SA to be next transmitted, and the like can also be further contained in the user data message.

FIG. 25 depicts another example of a structure (Syntax) of the user data message. It should be noted that in the illustration, only a user information portion is depicted. The user information portion is configured by 16 information units (IU). Similarly to the case of the user data message depicted in FIG. 18, the four pieces of information: "IEC 60958 Frame Rate"; "Original sampling frequency"; "Audio sampling frequency coefficient"; and "Data Type" are arranged in the first to fourth IUs.

Information of "an encryption mode" is arranged in the bits from the second bit to the 0-th bit of the fourth IU. In addition, time codes exhibiting the time of the start timings are arranged as information exhibiting the start timings of the digital audio signals SA to be next transmitted in the IUs from the fifth IU to the 15-th IU. For these time codes, Coordinated Universal Time with 64-bit accuracy is supposed.

Incidentally, it is also thought that information exhibiting a time until the start timing is arranged as the information exhibiting the start timing of the digital audio signals SA to be next transmitted instead of the time code. In this case, it is desirable to suitably decrement the time concerned whenever the user data message is transmitted. Although not described above, the transmission of the user data message may be carried out not only once near the switching timing of the digital audio signals SA, but also plural times.

Figure 26:
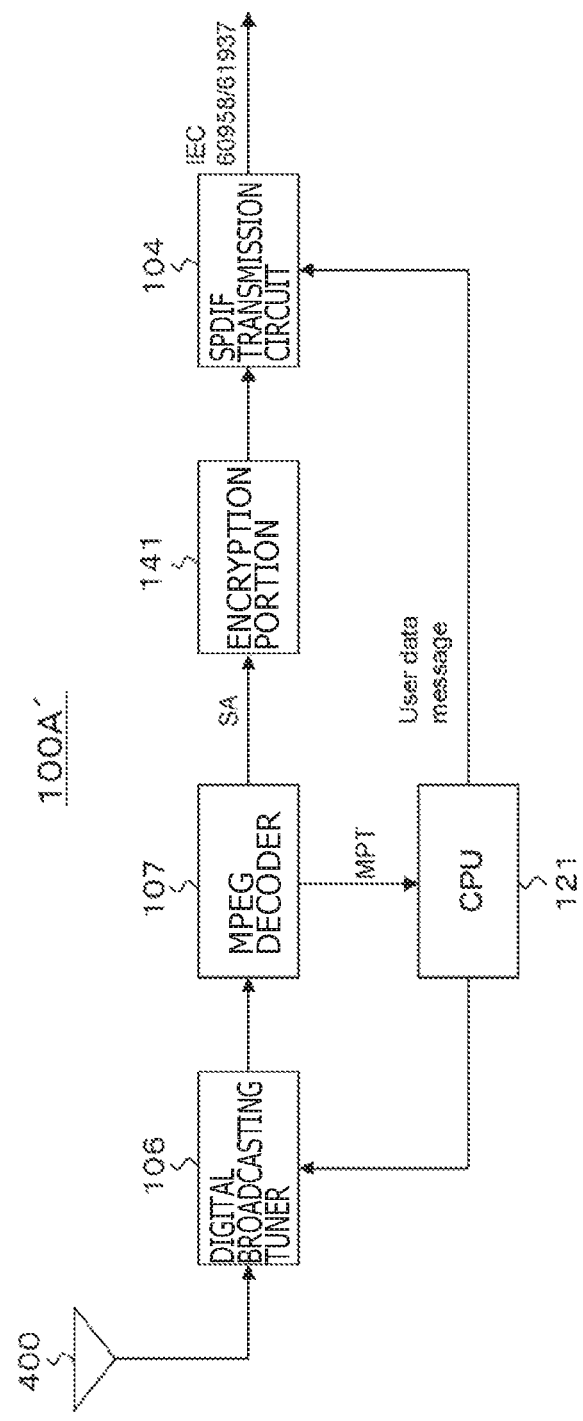
FIG. 26 is a block diagram depicting an example of a configuration of a transmission system in the television receiver in the case where the digital audio signal is encrypted and is transmitted.

As described above, the information of "the encryption mode" is arranged in the user data message in the case where the digital audio signals SA is encrypted and is transmitted. FIG. 26 depicts an example of a configuration of a transmission system 100A' of the television receiver 100 in the case where the digital audio signal SA is encrypted and is transmitted. In FIG. 26, portions corresponding to those in FIG. 17 are assigned the same reference numerals to be depicted. The digital audio signal SA which is sent from the MPEG decoder 107 to the SPDIF transmission circuit 104 is encrypted in the encryption portion 141.

Figure 27:
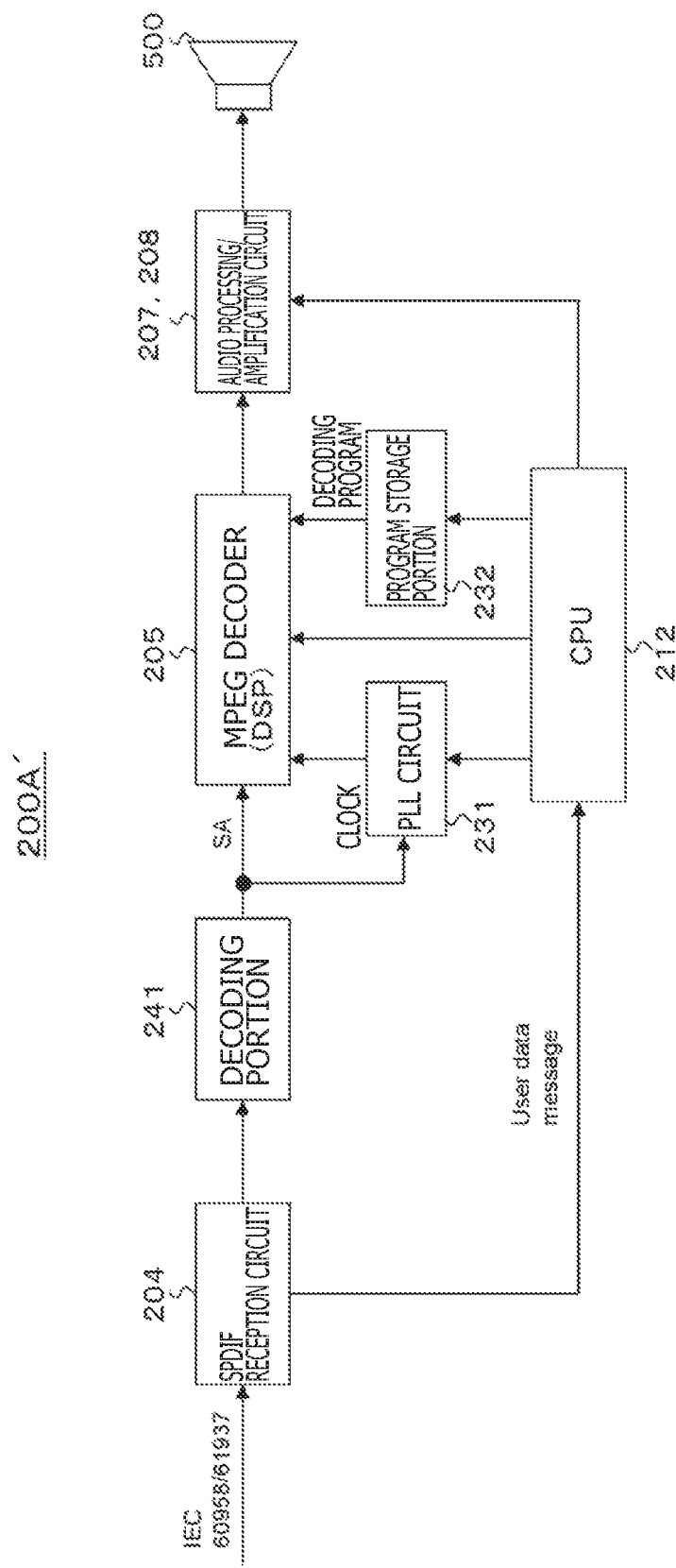
FIG. 27 is a block diagram depicting an example of a configuration of a reception system of an audio amplifier in the case where the digital audio signal is encrypted and is transmitted.

FIG. 27 depicts an example of a configuration of a reception system 200A' of the audio amplifier 100 in the case where the digital audio signal SA is encrypted and is transmitted. In FIG. 27, portions corresponding to those in FIG. 19 are assigned the same reference numerals to be depicted. In this case, after the encrypted digital audio signal SA obtained in the SPDIF reception circuit 204 is decoded in the decoding portion 241, the resulting digital audio signal is supplied to the MPEG decoder 205. The decoding processing in the decoding portion 241 is made to correspond to the encryption mode based on the information of "the encryption mode" contained in the user data message.

Incidentally, the following is considered as an example of utilization of the information exhibiting the start timing of the digital audio signal SA to be next transmitted which is arranged in the user data message as described above. For example, when the control by the reception device is carried out by the multi-task, by taking the time until the switching into consideration, it is possible to cope this situation by changing the priority of the task for switching the audio decoder.

In addition, in the embodiment described above, when the information is added to the digital audio signal SA, the user data is used which can be sent at an arbitrary timing. However, when the time resolution may be rough, the information can also be defined in the reserved area of the channel status.

In addition, in the embodiment described above, the example is illustrated in which HDMI ARC is utilized in order to transmit the SPDIF signal from the television receiver 100 to the audio amplifier 200. In a word, that example is an example in which HDMI ARC is utilized as the IEC 60958 transmission path. The present technique can be also similarly applied to an example in which a coaxial cable or an optical cable is utilized as the IEC 60958 transmission path.

Figure 28:
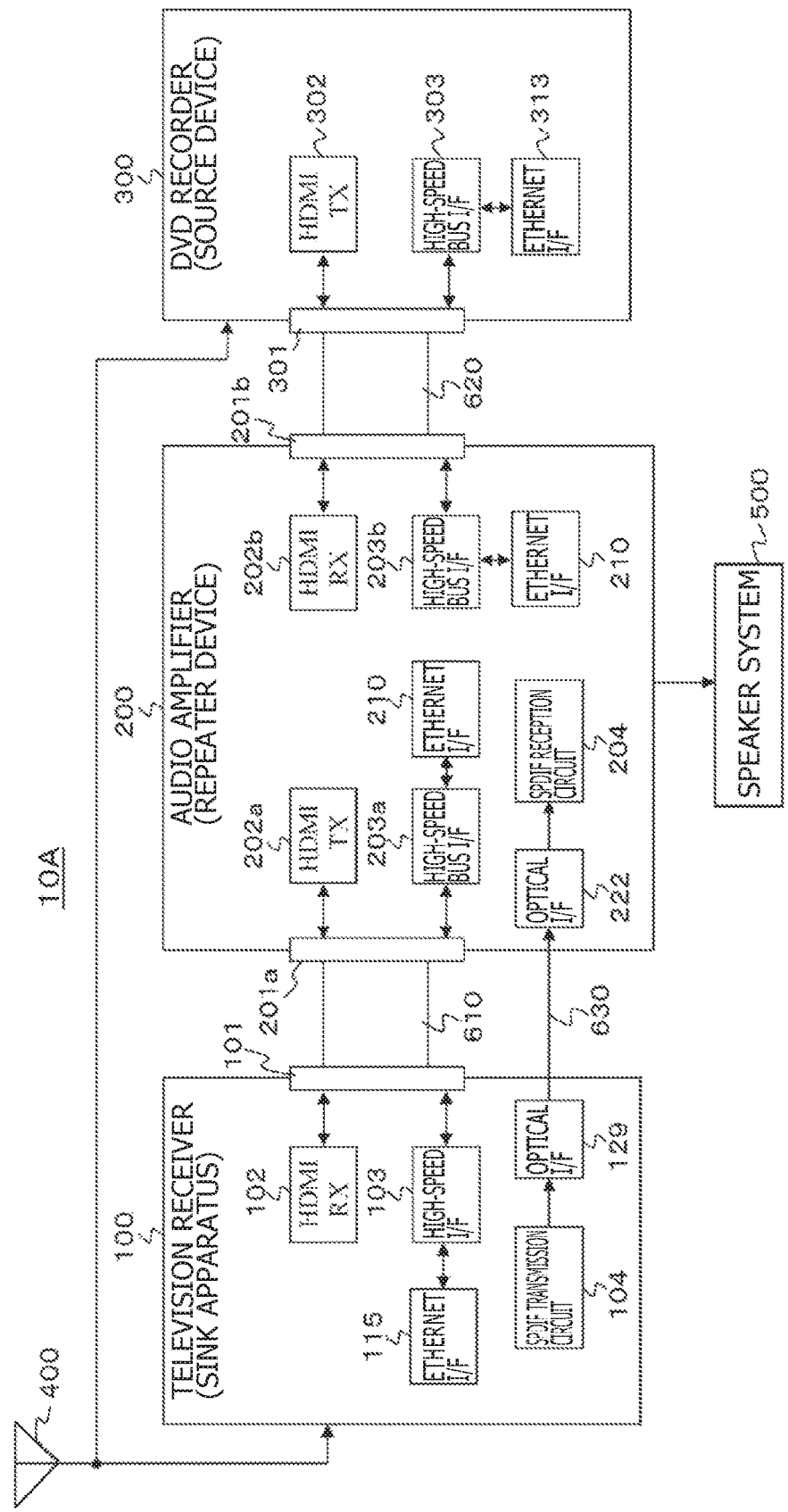
FIG. 28 is a block diagram depicting an example of a configuration of an AV system in the case where an optical cable is utilized as an IEC 60958 transmission path.

FIG. 28 depicts an example of a configuration of an AV system 10A in the case where an optical cable is utilized as the IEC 60958 transmission path. In FIG. 28, portions corresponding to those in FIG. 1 are assigned the same reference numerals and the detailed description thereof is suitably omitted here. In the AV system 10A, the television receiver 100 is provided with an optical interface 129, and the audio amplifier 200 is provided with an optical interface 222. Then, the SPDIF signal which is outputted from the SPDIF transmission circuit 104 of the television receiver 100 is transmitted to the SPDIF reception circuit 204 of the audio amplifier 200 through an optical interface 129, an optical cable 630, and the optical interface 222.

Incidentally, in the foregoing, we refer to the example in which HDMI ARC is utilized as the IEC 60958 transmission path (refer to FIG. 1), and the example in which the coaxial cable or the optical cable is utilized as the IEC 60958 transmission path (refer to FIG. 28).

In addition thereto, an example is also considered in which the HDMI transmission path is utilized as IEC 60958 transmission path. In this case, the SPDIF signal (IEC 60958 signal) is mapped to an audio sample packet, and is transmitted in the same forward direction as that in the video transmission. Likewise, an example is also considered in which the IEC 61883-6 transmission path, the MHL transmission path, a display port transmission path (DP transmission path) or the like is utilized as the IEC 60958 transmission path. In these cases as well, the SPDIF signal (IEC 60958 signal) is mapped to an audio sample packet, and is transmitted in the same forward direction as that in the video transmission.

In addition, the present technique can also adopt the following constitutions.

(1)

A transmission device, including:

a transmission portion configured to transmit a digital audio signal to an external apparatus through a predetermined transmission path; and an information adding portion configured to add information associated with the digital audio signal to be next transmitted to the digital audio signal which is currently transmitted.

(2)

The transmission device according to (1) described above, in which first metadata exhibiting a transmission frequency of the digital audio signal, and second metadata exhibiting a data type of the digital audio signal are contained in the information.

(3)

The transmission device according to (2) described above, in which third metadata exhibiting a sampling frequency used during conversion into an analog signal, and fourth metadata exhibiting a ratio of the transmission frequency to the sampling frequency are further contained in the information.

(4)

The transmission device according to any one of (1) to (3) described above, in which time information exhibiting a transmission start timing of the digital audio signal to be next transmitted is contained in the information.

(5)

The transmission device according to (4) described above, in which the time information is a time code exhibiting time of the transmission start timing.

(6)

The transmission device according to (4) described above, in which the time information is information exhibiting a time until the transmission start timing.

(7)

The transmission device according to any one of (1) to (6) described above, in which when the digital audio signal is encrypted and transmitted, information exhibiting a mode of the encryption is contained in the information.

(8)

The transmission device according to any one of (1) to (7) described above, in which the transmission portion successively transmits the digital audio signal every unit data, and the information adding portion adds the information by using a user data bit of a predetermined number of continuous unit data.

(9)

The transmission device according to any one of (1) to (8) described above, further including:

a broadcasting receiving portion configured to obtain the digital audio signal from a received broadcasting signal, in which the information adding portion acquires the information from the broadcasting signal.

(10)

The transmission device according to any one of (1) to (8) described above, further including:

a medium reading portion configured to read and obtain the digital audio signal from a medium, in which the information adding portion acquires the information from the medium.

(11)

The transmission device according to any one of (1) to (10) described above, in which the transmission portion starts the transmission of the digital audio signal to be next transmitted at a time point at which a given time elapses from a time point of end of transmission of the digital audio signal which is currently transmitted.

(12)

The transmission device according to any one of (1) to (11) described above, in which the predetermined transmission path is a coaxial cable, an optical cable, an Ethernet (IEC 61883-6) cable, an HDMI cable, an MHL cable or a display port cable.

(13)

A transmission method, including:

a transmission step of transmitting a digital audio signal to an external apparatus through a predetermined transmission path by a transmission portion; and an information adding step of adding information associated with the digital audio signal to be next transmitted to the digital audio signal which is currently transmitted.

(14)

A reception device, including:

a reception portion configured to receive a digital audio signal from an external apparatus through a predetermined transmission path; and a processing portion configured to process the digital audio signal, in which information associated with the digital audio signal to be next received is added to the digital audio signal which is currently received, and the processing portion processes the digital audio signal to be next received based on the information.

(15)

The reception device according to (14) described above, in which first metadata exhibiting a transmission frequency of the digital audio signal, and second metadata exhibiting a data type of the digital audio signal are contained in the information, and the processing portion locks a PLL to a frequency corresponding to a transmission frequency exhibited by the first metadata, and subjects the digital audio signal to be next received to processing corresponding to the data type exhibited by the second metadata by using a clock signal having the frequency to which the PLL is locked.

(16)

The reception device according to (14) or (15) described above, in which the processing portion starts preparation for processing the digital audio signal to be next received based on the information from a time point at which the information added to the digital audio signal which is currently received is extracted.

(17)

The reception device according to (14) or (15) described above, in which the processing portion starts preparation for processing the digital audio signal to be next received based on the information after the information added to the digital audio signal which is currently received is extracted from a time point of end of transmission of the current digital audio signal.

(18)

The reception device according to any one of (14) to (17) described above, in which the predetermined transmission path is a coaxial cable, an optical cable, an Ethernet (IEC 61883-6) cable, an HDMI cable, an MHL cable or a display port cable.

(19)

A reception method, including:

a reception step of receiving a digital audio signal from an external apparatus through a predetermined transmission path by a reception portion; and a processing step of processing the digital audio signal, in which information associated with the digital audio signal to be next received is added to the digital audio signal which is currently received, and in the processing step, the digital audio signal to be next received is processed based on the information.

REFERENCE SIGNS LIST 10, 10A . . . AV system
100 . . . Television receiver
100A, 100A' . . . Transmission system for digital audio signal
101 . . . HDMI terminal
102 . . . HDMI reception portion
103 . . . High-speed bus interface
104 . . . SPDIF transmission circuit
105 . . . Antenna terminal
106 . . . Digital broadcasting tuner
107 . . . MPEG decoder
108 . . . Video signal processing circuit
109 . . . Graphic producing circuit
110 . . . Panel driving circuit
111 . . . Display panel
112 . . . Audio signal processing circuit
113 . . . Audio amplifying circuit
114 . . . Speaker
115 . . . Ethernet interface
116 . . . Network terminal
120 . . . Internal bus
121 . . . CPU
122 . . . Flash ROM
123 . . . DRAM
124 . . . Display control portion
125 . . . Remote control reception portion
126 . . . Remote control transmission portion
127 . . . Power source portion
128 . . . Plug connection transfer circuit
141 . . . Encryption portion
200 . . . Audio amplifier
200A, 200A' . . . Reception system for digital audio signal
201a, 201b . . . HDMI terminal
202a . . . HDMI transmission portion
202b . . . HDMI reception portion
203a, 203b . . . High-speed bus interface
204 . . . SPDIF reception circuit
205 . . . MPEG decoder
206 . . . Video/graphic processing circuit
207 . . . Audio processing circuit
208 . . . Audio amplifying circuit
209 . . . Audio output terminal
210 . . . Ethernet interface
211 . . . Internal bus
212 . . . CPU
213 . . . Flash ROM
214 . . . DRAM
215 . . . Display control portion
216 . . . Panel driving circuit
217 . . . Display panel
218 . . . Power source portion
219 . . . Remote control reception portion
220 . . . Remote control transmission portion
221 . . . Plug connection detecting circuit
231 . . . PLL circuit
232 . . . Program storing portion
241 . . . Decoding portion
300A . . . Transmission system for digital audio signal in medium reproducer
300 . . . BD player
301 . . . HDMI terminal
302 . . . HDMI transmission portion
303 . . . High-speed bus interface
304 . . . Internal bus
305 . . . CPU
306 . . . Flash ROM
307 . . . SDRAM
308 . . . Display control portion
309 . . . Remote control reception portion
310 . . . Remote control transmission portion
311 . . . Storage medium control interface
312a . . . BD drive
312b . . . HDD
312c . . . SSD
313 . . . Ethernet interface 314 . . . Network terminal
315 . . . MPEG decoder
316 . . . Graphic producing circuit
317 . . . Video output terminal
318 . . . Audio output terminal
319 . . . Panel driving circuit
320 . . . Display panel
321 . . . Power source portion
400 . . . Reception antenna
500 . . . Speaker system
610, 620 . . . HDMI cable
630 . . . Optical cable

The invention claimed is:

1. A transmission device, comprising:
a transmission portion configured to transmit a first digital audio signal to an external apparatus via a transmission path; and
an information adding portion configured to add information associated with a second digital audio signal, to the transmitted first digital audio signal, wherein
the second digital audio signal is transmitted subsequent to the transmission of the first digital audio signal, and
the information comprises time information that includes a transmission start timing of the second digital audio signal.

2. The transmission device according to claim 1, wherein the information comprises:
first metadata including a transmission frequency of the second digital audio signal, and
second metadata including a data type of the second digital audio signal.

3. The transmission device according to claim 2, wherein the information further comprises:
third metadata including a sampling frequency to be used for conversion of the second digital audio signal into an analog signal, and
fourth metadata including a ratio of the transmission frequency to the sampling frequency.

4. The transmission device according to claim 1, wherein the time information is a time code indicating the transmission start timing.

5. The transmission device according to claim 1, wherein the time information indicates a time period until the transmission start timing.

6. The transmission device according to claim 1, wherein the second digital audio signal is encrypted and transmitted, and
the information comprises a mode of encryption of the second digital audio signal.

7. The transmission device according to claim 1, wherein the transmission portion is configured to successively transmit each unit data of the first digital audio signal, and
the information adding portion is configured to add the information to the transmitted first digital audio signal based on a user data bit of a number of continuous unit data.

8. The transmission device according to claim 1, further comprising:
a broadcasting receiving portion configured to obtain the first digital audio signal from a received broadcasting signal, wherein the information adding portion is further configured to acquire the information from the broadcasting signal.

9. The transmission device according to claim 1, further comprising: a medium reading portion configured to read and obtain the second digital audio signal from a medium, wherein the information adding portion is configured to acquire the information from the medium.

10. The transmission device according to claim 1, wherein the transmission portion is configured to start the transmission of the second digital audio signal a time point at which a specific time period elapses from a time point of end of transmission of the transmitted first digital audio signal.

11. The transmission device according to claim 1, wherein the transmission path is one of a coaxial cable, an optical cable, an Ethernet (IEC 61883-6) cable, an HDMI (High-Definition Multimedia Interface) cable, an MHL (Mobile High-Definition Link) cable or a display port cable.

12. A transmission method, comprising:
transmitting, by a transmission portion, a first digital audio signal to an external apparatus via a transmission path; and
adding information associated with a second digital audio signal to the first digital audio signal, wherein
the second digital audio signal is transmitted subsequent to the transmission of the first digital audio signal, and
the information comprises time information that includes a transmission start timing of the second digital audio signal.

13. A reception device, comprising:
a reception portion configured to receive a first digital audio signal from an external apparatus via a transmission path; and
a processing portion configured to:
process the first digital audio signal, wherein
information associated with a second digital audio signal is added to the received first digital audio signal,
the second digital audio signal is received subsequent to the reception of the first digital audio signal,
the information comprises time information that includes a transmission start timing of the second digital audio signal; and
process the second digital audio signal based on the information.

14. The reception device according to claim 13, wherein the information comprises first metadata and second metadata,
the first metadata comprises a transmission frequency of the second digital audio signal, and
the second metadata comprises a data type of the second digital audio signal, and
the processing portion is further configured to:
lock a Phase Locked Loop (PLL) to a frequency corresponding to the transmission frequency in the first metadata, and
process the second digital audio signal based on the data type in the second metadata and a clock signal with the frequency to which the PLL is locked.

15. The reception device according to claim 13, wherein the processing portion is configured to start preparation to process the second digital audio signal based on the information, and
the preparation to process is started from a time point at which the information added to the first digital audio signal is extracted.

16. The reception device according to claim 13, wherein the processing portion is configured to start preparation to process the second digital audio signal based on the information extracted from the first digital audio signal, preparation to process is started after the information added to the first digital audio signal is extracted from the first digital audio signal, and the information is extracted after a time point of end of transmission of the first digital audio signal.

17. The reception device according to claim 13, wherein the transmission path is one of a coaxial cable, an optical cable, an Ethernet (IEC 61883-6) cable, an HDMI cable, an MHL cable or a display port cable.

18. A reception method, comprising:
receiving, by a reception portion, a first digital audio signal from an external apparatus via a transmission path; and
processing the received first digital audio signal, wherein information associated with a second digital audio signal, is added to the received first digital audio signal
the second digital audio signal is processed based on the information, and
the information comprises time information that includes a transmission start timing of the second digital audio signal.

19. A transmission device, comprising:
a broadcasting receiving portion configured to obtain a first digital audio signal from a received broadcasting signal;
a transmission portion configured to transmit the first digital audio signal to an external apparatus via a transmission path; and
an information adding portion configured to:
acquire information associated with a second digital audio signal from the received broadcasting signal, wherein the second digital audio signal is transmitted subsequent to the transmission of the first digital audio signal, and
add the information associated with the second digital audio signal, to the transmitted first digital audio signal.

20. The transmission device according to claim 19, wherein the information comprises:
first metadata including a transmission frequency of the second digital audio signal, and
second metadata including a data type of the second digital audio signal.

21. The transmission device according to claim 20, wherein the information further comprises:
third metadata including a sampling frequency to be used for conversion of the second digital audio signal into an analog signal, and
fourth metadata including a ratio of the transmission frequency to the sampling frequency.

22. The transmission device according to claim 19, wherein the information further comprises time information including a transmission start timing of the second digital audio signal.

23. The transmission device according to claim 22, wherein the time information is a time code indicating the transmission start timing.

24. The transmission device according to claim 22, wherein the time information indicates a time period until the transmission start timing.

25. The transmission device according to claim 19, wherein
the second digital audio signal is encrypted and transmitted, and
the information comprises a mode of encryption of the second digital audio signal.

26. The transmission device according to claim 19, wherein
the transmission portion is configured to successively transmit each unit data of the first digital audio signal, and
the information adding portion is configured to add the information to the transmitted first digital audio signal based on a user data bit of a number of continuous unit data.

27. The transmission device according to claim 19, further comprising: a medium reading portion configured to read and obtain the second digital audio signal from a medium, wherein the information adding portion is configured to acquire the information from the medium.

28. The transmission device according to claim 19, wherein the transmission portion is configured to start the transmission of the second digital audio signal a time point at which a specific time elapses from a time point of end of transmission of the transmitted first digital audio signal.

29. The transmission device according to claim 19, wherein the transmission path is a one of coaxial cable, an optical cable, an Ethernet (IEC 61883-6) cable, an HDMI cable, an MHL cable or a display port cable.

30. A transmission method, comprising:
obtaining a first digital audio signal from a received broadcasting signal;
transmitting, by a transmission portion, the first digital audio signal to an external apparatus via a transmission path;
acquiring information associated with a second digital audio signal from the received broadcasting signal; and
adding the information associated with the second digital audio signal to the first digital audio signal, wherein the second digital audio signal is transmitted subsequent to the transmission of the first digital audio signal.

31. A reception device, comprising:
a reception portion configured to receive a first digital audio signal from an external apparatus via a transmission path, wherein the first audio signal is obtained, from a broadcasting signal, by the external apparatus; and
a processing portion configured to:
process the first digital audio signal, wherein
information associated with a second digital audio signal is added to the received first digital audio signal,
the information is acquired from the broadcasting signal by the external apparatus, and
the second digital audio signal is received subsequent to the reception of the first digital audio signal; and
process the second digital audio signal based on the information.

32. The reception device according to claim 31, wherein
the information comprises first metadata and second metadata,
the first metadata comprises a transmission frequency of the second digital audio signal, and
the second metadata comprises a data type of the second digital audio signal, and
the processing portion is configured to:
lock a Phase Locked Loop (PLL) to a frequency corresponding to the transmission frequency comprised in the first metadata, and process the second digital audio signal based on the data type comprised in the second metadata and a clock signal with the frequency to which the PLL is locked.

33. The reception device according to claim 31, wherein
the processing portion is configured to start preparation to process the second digital audio signal based on the information, and the preparation to process is started from a time point at which the information added to the first digital audio signal is extracted.

34. The reception device according to claim 31, wherein
the processing portion is configured to start preparation to process the second digital audio signal based on the information extracted from the first digital audio signal, preparation to process is started after the information added to the first digital audio signal is extracted from the first digital audio signal, and the information is extracted after a time point of end of transmission of the first digital audio signal.

35. The reception device according to claim 31, wherein the transmission path is one of a coaxial cable, an optical cable, an Ethernet (IEC 61883-6) cable, an HDMI cable, an MHL cable or a display port cable.

36. A reception method, comprising:

receiving, by a reception portion, a first digital audio signal from an external apparatus via a transmission path, wherein the first audio signal is obtained, from a broadcasting signal, by the external apparatus;

processing the received first digital audio signal, wherein
information associated with a second digital audio signal, is added to the received first digital audio signal, the information is acquired from the broadcasting signal by the external apparatus, and the second digital audio signal is processed based on the information.

* * * * *